US012666293B2

(12) United States Patent
Kazmi et al.

(10) Patent No.: US 12,666,293 B2
(45) Date of Patent: Jun. 23, 2026

(54) MEASUREMENT RULES UNDER CONCURRENT MEASUREMENT GAP CANCELLATION

(71) Applicant: Telefonaktiebolaget LM Ericsson (publ), Stockholm (SE)

(72) Inventors: Muhammad Ali Kazmi, Sundbyberg (SE); Zhixun Tang, Beijing (CN); Joakim Axmon, Limhamn (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 327 days.

(21) Appl. No.: 18/294,741

(22) PCT Filed: Aug. 5, 2022

(86) PCT No.: PCT/EP2022/072110
§ 371 (c)(1),
(2) Date: Feb. 2, 2024

(87) PCT Pub. No.: WO2023/012340
PCT Pub. Date: Feb. 9, 2023

(65) Prior Publication Data
US 2024/0349097 A1     Oct. 17, 2024

(51) Int. Cl.
*H04W 24/10* (2009.01)
*H04L 5/00* (2006.01)
*H04W 28/06* (2009.01)

(52) U.S. Cl.
CPC ........... *H04W 24/10* (2013.01); *H04L 5/0051* (2013.01); *H04W 28/06* (2013.01)

(58) Field of Classification Search
CPC ...... H04W 24/10; H04W 28/06; H04L 5/0051
(Continued)

(56) References Cited

U.S. PATENT DOCUMENTS

| | | | | |
|---|---|---|---|---|
| 2016/0381588 A1* | 12/2016 | Strobl | ................... | H04W 24/10 455/67.11 |
| 2019/0074918 A1* | 3/2019 | Huang | ................. | H04B 17/391 |
| 2020/0389929 A1* | 12/2020 | Harada | ................. | H04W 24/10 |

FOREIGN PATENT DOCUMENTS

WO         2019162513 A1     8/2019

OTHER PUBLICATIONS

International Search Report and Written Opinion dated Nov. 28, 2022 for International Application No. PCT/EP2022/072110 filed Aug. 5, 2022; consisting of 15 pages.
(Continued)

*Primary Examiner* — Hermon Asres
(74) *Attorney, Agent, or Firm* — Weisberg I.P. Law, P.A.

(57)         ABSTRACT

A network node and method for measurement rules under concurrent measurement gap cancellation are disclosed. A configuration is received, where the configuration indicates a first measurement gap pattern having a first plurality of measurement gaps and a second measurement gap pattern having a second plurality of measurement gaps. A first reference signal is measured according to the first measurement gap pattern and a second reference signal is measured according to the second measurement gap pattern. A number N of the first plurality of measurement gaps for performing measurements is cancelled based on an overlap of at least one of the first plurality of measurement gaps with at least one of the second plurality of measurement gaps. At least one action is performed based on N being greater than a first threshold value.

20 Claims, 9 Drawing Sheets

(58) Field of Classification Search
USPC ........................................................ 370/329
See application file for complete search history.

(56) References Cited

OTHER PUBLICATIONS

3GPP TSG-RAN WG4 Meeting #99-e, R4-2109992; Title: Discussion on multiple concurrent and independent gap patterns; Agenda Item: 9.10.2.2; Source: MediaTek Inc.; Document for: Discussion; Date and Location: May 19-27, 2021, Electronic Meeting; consisting of 9 pages.

3GPP TSG-RAN WG4 Meeting #99-e, R4-2109181; Title: Discussion on concurrent gaps; Agenda Item: 9.10.2.2., Source: MediaTek Inc.; Document for: Discussion; Date and Location: May 19-27, 2021, Electronic Meeting; consisting of 6 pages.

3GPP TSG-RAN WG4 Meeting # 98-e-Bis, R4-2103714; Title: Email discussion summary for [98e][233] NR_MG_enh_1; Agenda item: 11.5.1 and 11.5.2.2; Source: Moderator (MediaTek inc.); Document for: Information; Date and Location: Jan. 25-Feb. 5, 2021, Electronic Meeting; consisting of 50 pages.

3GPP TS 38.133 V17.2.0; 3rd Generation Partnership Project; Technical Specification Group Radio Access Network; NR; Requirements for support of radio resource management (Release 17); Jun. 2021; consisting of 3211 pages.

* cited by examiner

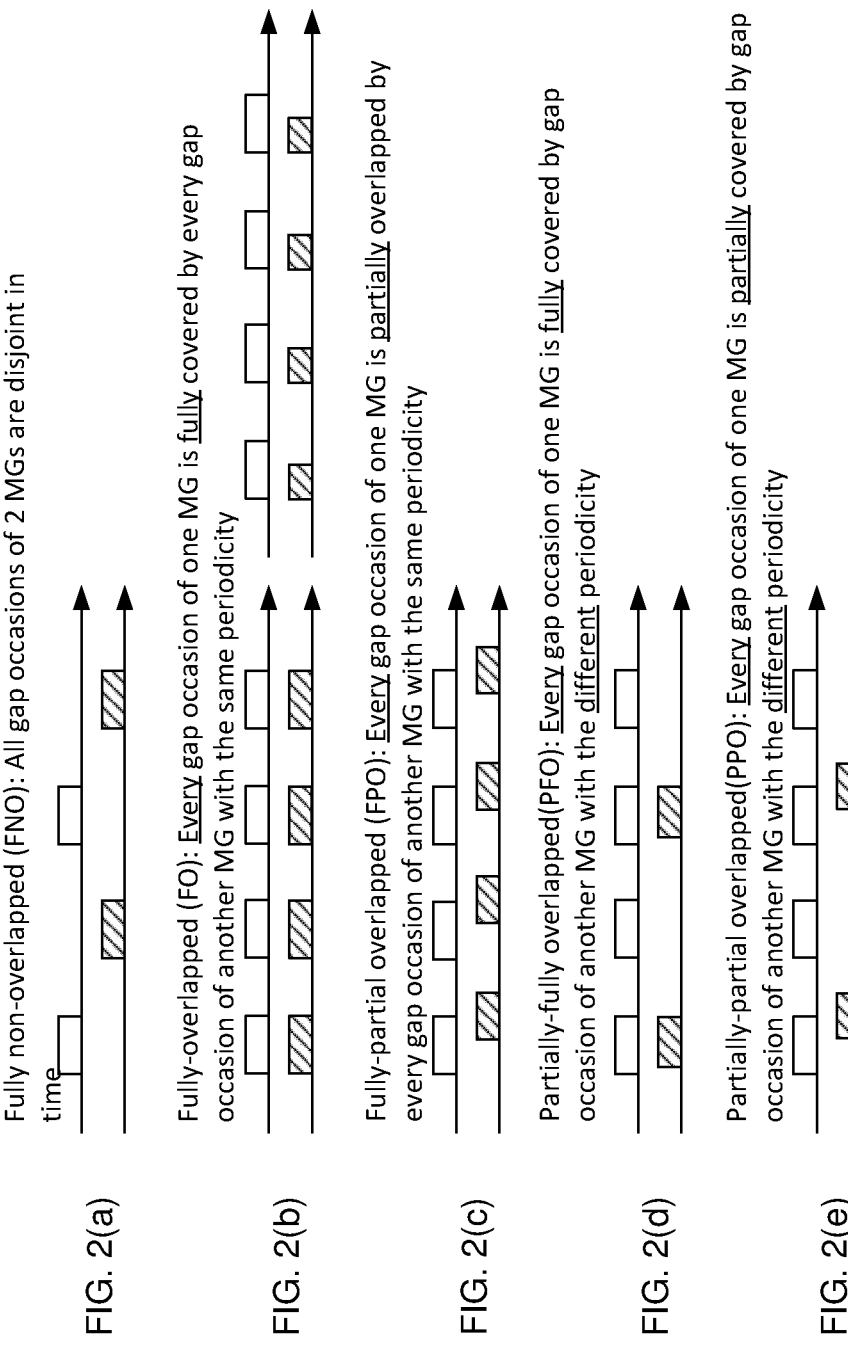

FIG. 2(a)

Fully non-overlapped (FNO): All gap occasions of 2 MGs are disjoint in time

FIG. 2(b)

Fully-overlapped (FO): Every gap occasion of one MG is fully covered by every gap occasion of another MG with the same periodicity

FIG. 2(c)

Fully-partial overlapped (FPO): Every gap occasion of one MG is partially overlapped by every gap occasion of another MG with the same periodicity

FIG. 2(d)

Partially-fully overlapped(PFO): Every gap occasion of one MG is fully covered by gap occasion of another MG with the different periodicity

FIG. 2(e)

Partially-partial overlapped(PPO): Every gap occasion of one MG is partially covered by gap occasion of another MG with the different periodicity

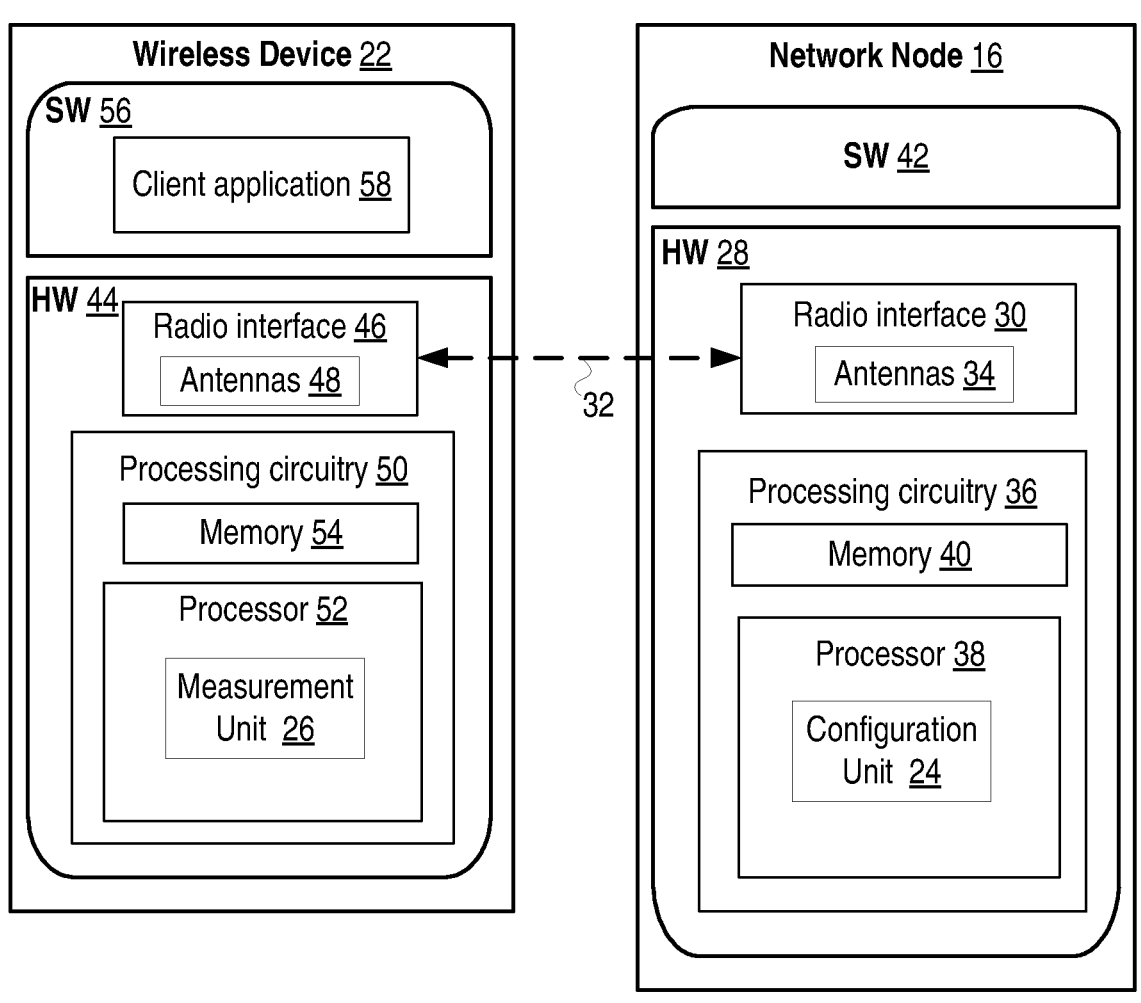
FIG. 4

MEASUREMENT RULES UNDER CONCURRENT MEASUREMENT GAP CANCELLATION

CROSS-REFERENCE TO RELATED APPLICATIONS

This application is a Submission Under 35 U.S.C. § 371 for U.S. National Stage Patent Application of International Application No.: PCT/EP2022/072110, filed Aug. 5, 2022 entitled "MEASUREMENT RULES UNDER CONCURRENT MEASUREMENT GAP CANCELLATION," which claims priority to International Application No.: PCT/CN2021/110936, filed Aug. 5, 2021, the entireties of both of which are incorporated herein by reference.

TECHNICAL FIELD

This disclosure relates to wireless communication and in particular, to measurement rules under concurrent measurement gap cancellation.

BACKGROUND

The Third Generation Partnership Project (3GPP) has developed and is developing standards for Fourth Generation (4G) (also referred to as Long Term Evolution (LTE)) and Fifth Generation (5G) (also referred to as New Radio (NR)) wireless communication systems. Such systems provide, among other features, broadband communication between network nodes, such as base stations, and mobile wireless devices (WDs), as well as communication between network nodes and between wireless devices. Sixth Generation (6G) wireless communication systems are also under development.

Wireless communication systems according to the 3GPP may include the following channels:

A physical downlink control channel, PDCCH;
A physical uplink control channel, PUCCH;
A physical downlink shared channel, PDSCH;
A physical uplink shared channel, PUSCH;
A physical broadcast channel, PBCH; and
A physical random access channel, PRACH.

A measurement gap pattern (MGP) is used by the wireless device to perform measurements on cells of non-serving carriers (e.g., inter-frequency carrier, inter-radio access technology (RAT) carriers, etc.) In New Radio, measurement gaps are also used for measurements on cells of the serving carrier in some scenarios, for example, when the measured signals (e.g., synchronization signal blocks (SSBs)) are outside the bandwidth part (BWP) of the serving cell. The wireless device is scheduled in the serving cell only within the BWP.

During the measurement gap, the wireless device cannot be scheduled for receiving or transmitting signals in the serving cell. A measurement gap pattern is characterized or defined by several parameters: measurement gap length (MGL), measurement gap repetition period (MGRP) and measurement gap time offset from a reference time (e.g., a slot offset with respect to a serving cell's system frame number (SFN) such as SFN=0). An example of a measurement gap pattern (MGP) is shown in FIG. 1. Examples of MGL may include 1.5, 3, 3.5, 4, 5.5 or 6 ms, and examples of MGRP may include 20, 40, 80 or 160 ms. An MGP is configured by the network node and is also called a network controlled or network configurable MGP. Therefore the serving base station is fully aware of the timing of each measurement gap within the MGP.

In NR, there are two major categories of measurement gap patterns (MGPs): per-wireless device measurement gap patterns and per-frequency range (FR) measurement gap patterns. In NR, the spectrum is divided into two frequency ranges called FR1 and FR2. FR1 is currently defined from 410 MHz to 7125 MHz. The FR2 range is currently defined from 24250 MHz to 52600 MHz. In another example, the FR2 range can be from 24250 MHz to 71000 MHz. The FR2 range is also interchangeably called a millimeter wave (mmwave) range and corresponding bands in FR2 are called mmwave bands. In the future, more frequency ranges may be specified, e.g., FR3. An example of FR3 is frequency ranging above 52600 MHz or between 52600 MHz and 71000 MHz or between 7125 MHz and 24250 MHz.

When configured with per-wireless device MGP, the wireless device creates measurement gaps on all the serving cells (e.g., primary cell (Pcell), primary secondary cell (PSCell), secondary cells (Scells), etc.) regardless of their frequency range. The per-wireless device MGP can be used by the wireless device for performing measurements on cells of any carrier frequency belonging to any RAT or frequency range (FR). When configured with per-FR MGP (if the wireless device supports this capability), the wireless device creates measurement gaps only on the serving cells of the indicated FR whose carriers are to be measured. For example, if the wireless device is configured with a per-FR1 MGP, then the wireless device creates measurement gaps only on serving cells (e.g. PCell, PSCell, Scells, etc.) of FR1, while no measurement gaps are created on serving cells on carriers of FR2. The per-FR1 measurement gaps can be used for measurement on cells of only FR1 carriers. Similarly, per-FR2 measurement gaps when configured are only created on FR2 serving cells and can be used for measurement on cells of only FR2 carriers. Support for per FR measurement gaps is depends on wireless device capability. Certain wireless devices may only support per-wireless device MGPs.

A radio resource control (RRC) message for measurement gap configuration provided by the network node to the wireless device is shown below.

MeasGapConfig

The information element (IE) MeasGapConfig specifies the measurement gap configuration and controls setup and release of measurement gaps, an example of which follows:

```
ASN1START
-- TAG-MEASGAPCONFIG-START
MeasGapConfig ::=                      SEQUENCE {
    gapFR2                             SetupRelease { GapConfig }
OPTIONAL,    -- Need M ...,
    [[
    gapFR1                            SetupRelease { GapConfig }
OPTIONAL,    -- Need M
```

-continued

```
    gapUE                          SetupRelease { GapConfig }
OPTIONAL    -- Need M
    ]]
  }
  GapConfig ::=                    SEQUENCE {
    gapOffset                      INTEGER (0..159),
    mgl                            ENUMERATED {ms1dot5, ms3, ms3dot5,
ms4, ms5dot5, ms6},
    mgrp                           ENUMERATED {ms20, ms40, ms80,
ms160},
    mgta                           ENUMERATED {ms0, ms0dot25,
ms0dot5},
    ...,
    [[
    refServCellIndicator                   ENUMERATED {pCell, pSCell,
mcg-FR2}   OPTIONAL    -- Cond NEDCorNRDC
    ]],
    [[
    refFR2ServCellAsyncCA-r16              ServCellIndex
OPTIONAL,    -- Cond AsyncCA
    mgl-r16                        ENUMERATED {ms10, ms20}
OPTIONAL    -- Cond PRS
    ]]
  }
  -- TAG-MEASGAPCONFIG-STOP
  -- ASN1S
```

MeasGapConfig field descriptions are set forth in Table 1.

TABLE 1

MeasGapConfig field descriptions gapFR1 Indicates a measurement gap configuration that applies to FR1 only. In (NG)EN-DC, gapFR1 cannot be set up by NR RRC (i.e., only LTE RRC can configure the FR1 measurement gap). In NR-evolved universal terrestrial access (EUTRA) dual connectivity (NE-DC), gapFR1 can only be set up by NR RRC (i.e., LTE RRC cannot configure the FR1 gap). In NR-DC, gapFR1 can only be set up in the measConfig associated with MCG. gapFR1 cannot be configured together with gapUE. The applicability of the FR1 measurement gap is according to Table 9.1.2-2 and Table 9.1.2-3 in 3GPP Technical Standard (TS) 38.133 [14].
gapFR2 Indicates a measurement gap configuration that applies to FR2 only. In (Next Generation) LTE-NR dual connectivity (EN-DC) or NE-DC, gapFR2 can only be set up by NR RRC (i.e., an LTE RRC cannot configure the FR2 gap). In NR-DC, gapFR2 can only be set up in the measConfig associated with MCG. gapFR2 cannot be configured together with gapUE. The applicability of the FR2 measurement gap is according to Table 9.1.2-2 and Table 9.1.2-3 in 3GPP TS 38.133 [14].
gapUE Indicates a measurement gap configuration that applies to all frequencies (FR1 and FR2). In (NG) EN-DC, gapUE cannot be set up by NR RRC (i.e., only LTE RRC can configure a per-wireless device measurement gap). In NE-DC, gapUE can only be set up by NR RRC (i.e. LTE RRC cannot configure per-wireless device measurement gap). In NR-DC, gapUE can only be set up in the measConfig associated with MCG. If gapUE is configured, then neither gapFR1 nor gapFR2 can be configured. The applicability of the per-wireless device measurement gap is according to Table 9.1.2-2 and Table 9.1.2-3 in 3GPP TS 38.133 [14].
gapOffset Value gapOffset is the measurement gap offset of the measurement gap pattern with MGRP indicated in the field mgrp. The value range is from 0 to mgrp-1.
Mgl Value mgl is the measurement gap length in ms of the measurement gap. The measurement gap length is according to Table 9.1.2-1 in 3GPP TS 38.133 [14]. Value ms1dot5 corresponds to 1.5 ms, ms3 corresponds to 3 ms and so on. If mgl-r16 is present, the wireless device shall ignore the mgl (without suffix).
Mgrp Value mgrp is the measurement gap repetition period in (ms) of the measurement gap. The measurement gap repetition period is according to Table 9.1.2-1 in 3GPP TS 38.133 [14].
Mgta Value mgta is the measurement gap timing advance in ms. The applicability of the measurement gap timing advance is according to clause 9.1.2 of 3GPP TS 38.133 [14]. Value ms0 corresponds to 0 ms, ms0dot25 corresponds to 0.25 ms and ms0dot5 corresponds to 0.5 ms. For FR2, the network only configures 0 ms and 0.25 ms.
refFR2ServCellIAsyncCA Indicates the FR2 serving cell identifier whose SFN and subframe is used for FR2 measurement gap calculation for this measurement gap pattern with asynchronous carrier aggregation (CA) involving FR2 carrier(s).
refServCellIndicator Indicates the serving cell whose SFN and subframe are used for measurement gap calculation for this measurement gap pattern. Value pCell corresponds to the PCell, pSCell corresponds to the PSCell, and mcg-FR2 corresponds to a serving cell on an FR2 frequency in the MCG.

An explanation of certain conditional presences are set forth in Table 2

TABLE 2

| Conditional Presence | Explanation |
|---|---|
| AsyncCA | This field is mandatorily present when configuring an FR2 measurement gap pattern to the wireless device in: (NG)EN-DC or NR SA with asynchronous CA involving FR2 carrier(s); NE-DC or NR-DC with asynchronous CA involving FR2 carrier(s), if the field refServCellIndicator is set to mcg-FR2. In case the measurement gap pattern to the wireless device in NE-DC and NR-DC is already configured and the serving cell used for the measurement gap calculation corresponds to a serving cell on an FR2 frequency in the MCG, then the field is optionally present, need M. Otherwise, it is absent, Need R. |
| NEDCorNRDC | This field is mandatorily present when configuring a measurement gap pattern to the wireless device in NE-DC or NR-DC. In case the measurement gap pattern to the wireless device in NE-DC and NR-DC is already configured, then the field is absent, need M. Otherwise, it is absent. |
| PRS | This field is optionally present, Need R, when configuring measurement gap pattern to the wireless device for measurements of downlink positioning reference signal (DL-PRS) configured via LTE positioning protocol (LPP) (3GPP TS 37.355 [49]). Otherwise, it is absent. |

In 3GPP NR Release 17 (Rel-17), there is consideration of introducing concurrent measurement gap patterns (MGP), i.e., support of at least two measurement gap patterns that are configured during the same period of time.

RAN4 has identified five major scenarios for concurrent measurement gaps which are shown in FIG. 2. The scenario in FIG. 2(a) illustrates two fully non-overlapping measurement gap patterns. Although here the measurement gap repetition periods (MGRP) are illustrated as being the same for both measurement gap patterns, this is not a requirement for the scenario to apply; MGRPs can differ between the MGPs, e.g., one MGRP may be 40 ms and the other 40 ms or 80 ms, and the scenario is fulfilled as long as measurement gaps in one MGP never overlap, partially or fully, with a measurement gap in another MGP. This scenario is referred to as the fully non-overlapping (FNO) scenario.

The scenarios in FIG. 2(b) illustrate two fully overlapping measurement gap patterns. In either case, one MGP is always contained within the other, and the MGRPs for the two MGPs are the same MGRP. These scenarios are referred to as fully overlapping (FO) scenarios.

The scenario in FIG. 2(c) illustrates two measurement gap patterns whose measurement gaps consistently partially overlap each other. The MGRPs are the same MGRP. The scenario is referred to as the fully-partial overlapped (FPO) scenario.

The scenario in FIG. 2(d) illustrates two measurement gap patterns that at least occasionally fully overlap each other. For this scenario to apply, the MGRPs have to be different. For example, one MGRP can be 40 ms and the other MGRP can be 80 ms. This scenario is referred to as the partially-fully overlapped (PFO) scenario.

The scenario in FIG. 2(e) illustrates two measurement gap patterns whose measurement gaps at least occasionally partially overlap each other. For this scenario to apply, the MGRPs for the two measurement gap patterns have to be different, e.g., one MGRP is 40 ms and the other MGRP is 80 ms. This scenario is referred to as the partially-partial overlapped (PPO) scenario.

In some concurrent measurement gap configurations, measurement gaps from two measurement gap patterns may occur close in time. This may result in delay in sending feedback signal or even loss of feedback signal (e.g., hybrid automatic repeat request (HARQ) feedback) degrading the serving cell performance by, for example, loss of data or throughput.

SUMMARY

Some embodiments advantageously provide a method and system for measurement rules under concurrent measurement gap cancellation. Some embodiments include methods in a wireless device and in a network node.

In some embodiments, measurement gap cancellation is provided along with rules that determine wireless device measurement behavior when the measurement gaps are cancelled. In some embodiments, the wireless device may cancel or discard one or more measurement gaps according to one or more rules when measurement gaps in the concurrent measurement gap pattern (MGP) occur close to each other in time. For example, when the wireless device is transmitting or receiving data.

In a first embodiment, a method in a wireless device comprises determining that the wireless device has or is going to cancel one or more measurement gaps of the MGP belonging to a concurrent measurement gap pattern (C-MGP). The method includes adapting, based on one or more rules, a measurement procedure for at least measurement being performed using a measurement gap pattern whose measurement gaps are cancelled or going to be cancelled. The rules for an adaptive measurement procedure can be pre-defined or configured by the network node. Examples of rules are:

In one example, whether the wireless device restarts the ongoing measurement or not, depends on a relationship between the number of cancelled measurement gaps (Ng) during measurement time and a threshold (Hg). For example, the wireless device may restart the measurement if Ng>Hg. In other words, the wireless device may restart the measurement if the number of cancelled measurement gaps Ng exceed the threshold Hg; otherwise, (if Ng≤Hg), the wireless device continues the ongoing measurement.

In another example, whether the wireless device discards (drops or abandon) the ongoing measurement or not, depends on a relationship between Ng and a threshold (Hm). Or, whether the wireless device discards the ongoing measurement or not depends on a relationship between the number of times the measurement is restarted due to measurement gap cancellation (Nr), and a threshold (Hr). For example, the wireless device may discard the measurement if Ng>Hm; otherwise, (if Ng≤Hm), then the wireless device may not discard the ongoing measurement. In another example, the wireless device may discard the measurement if Nr>Hr; otherwise, (if Nr≤Hr), the wireless device may not discard the ongoing measurement. In the latter case the wireless device may also restart the measurement as in the first rule above.

In another example, whether the wireless device starts using another MGP in a concurrent MGP (C-MGP) for performing the ongoing measurement or not, depends on a relationship between Ng and a threshold (Hgs), or a relationship between the number of times the measurement is restarted due to measurement gap cancellation (Nr) and a threshold (Hrs). For example, the wireless device may switch to another MGP for performing the measurement if Ng>Hgs; otherwise, (if Ng Hgs), the wireless device continues using the current MGP for the ongoing measurement. In another example, the wireless device switches to another MGP for performing the measurement if Nr>Hrs; otherwise, (if Nr≤Hrs), the wireless device continues using the current MGP for doing the ongoing measurement.

In another example, whether the wireless device activates and starts using a pre-configured MGP (P-MGP) for performing the ongoing measurement or not, depends on a relationship between Ng and a threshold (Hgp), or a relationship between the number of times the measurement is restarted due to measurement gap cancellation (Nr) and a threshold (Hrp). For example, the wireless device may activate and start using P-MGP for performing the measurement if Ng>Hgp; otherwise, (if Ng≤Hgp), the wireless device continues using the current MGP belonging to the C-MGP for the ongoing measurement. In another example, the wireless device may activate and start using P-MGP for performing the measurement if Nr>Hrp; otherwise, (if Nr≤Hrp), the wireless device continues using the current MGP belonging to C-MGP for doing the ongoing measurement.

In another example, the adaptive measurement procedure may comprise an extended measurement time (Tme) over which the wireless device performs measurement under measurement gap cancellation only when one or more conditions is met e.g., when the measurement gap cancellation rate exceeds some pre-defined threshold or by a network-configured threshold, Rcg.

When the wireless device cancels one or more measurement gaps of the currently configured MGP belonging to the concurrent MGP (C-MGP), then based on one or more rules, the wireless device may adapt its measurement procedure related to the ongoing measurement using the C-MGP. For example, if the number of cancelled measurement gaps or expected number of cancelled measurement gaps exceeds a certain threshold, then the wireless device may restart or discard the ongoing, configured measurement or it may switch to another MGP within C-MGP for continuing the measurement or it may activate one of the pre-configured MGPs for continuing the measurement.

Some advantages of some embodiments may include:

The wireless device measurement behavior is well defined.

The wireless device can still perform and complete the measurements after cancelling measurement gaps.

The mobility performance, which relies on measurement results is not degraded under measurement gap cancellation.

According to one aspect of the present disclosure, a wireless device in communication with a network node is provided. The wireless device includes processing circuitry configured to receive a configuration, where the configuration indicates a first measurement gap pattern having a first plurality of measurement gaps, and a second measurement gap pattern having a second plurality of measurement gaps. The processing circuitry is further configured to measure a first reference signal according to the first measurement gap pattern and a second reference signal according to the second measurement gap pattern. The processing circuitry is further configured to cancel a number N of the first plurality of measurement gaps for performing measurements based on an overlap of at least one of the first plurality of measurement gaps with at least one of the second plurality of measurement gaps. The processing circuitry is further configured to perform at least one action based on N being greater than a first threshold value.

According to one or more embodiments of this aspect, the performing of the at least one action includes at least one of discarding at least one measurement of one of the first reference signal and the second reference signal, restarting the measurement of one of the first reference signal and the second reference signal, using a third measurement gap pattern according to a concurrent measurement gap pattern for performing the measurement on the first reference signal, and activating a pre-configured measurement gap pattern for performing the measurement on the first reference signal. According to one or more embodiments of this aspect, the measuring of the first reference signal according to the first measurement gap pattern includes obtaining at least one measurement sample during at least one of the first plurality of measurement gaps and the measuring of the second reference signal according to the second measurement gap pattern includes obtaining at least one measurement sample during at least one of the second plurality of measurement gaps. According to one or more embodiments of this aspect, the discarding of the at least one measurement of one of the first reference signal and the second reference signal includes discarding one of the at least one measurement sample obtained during at least one of the first plurality of measurement gaps, and the at least one measurement sample obtained during at least one of the second plurality of measurement gaps. According to one or more embodiments of this aspect, the restarting of the measurement of one of the first reference signal and the second reference signal includes, at a first time, discarding one of the at least one measurement sample obtained during at least one of the first plurality of measurement gaps prior to the first time and the at least one measurement sample obtained during at least one of the second plurality of measurement gaps prior to the first time, and further includes, subsequent to the first time, obtaining one of at least one measurement sample during at least one of the first plurality of measurement gaps, and at least one measurement sample during at least one of the second plurality of measurement gaps. According to one or more embodiments of this aspect, the discarding of the at least one measurement of one of the first reference signal and the second reference signal is further based on a number M being greater than a second threshold value, where M is a number of times a measurement of one of the first reference signal and the second reference signal was restarted. According to one or more embodiments of this aspect, the wireless device is pre-configured with a third measurement gap pattern, and the performing of the at least one action includes measuring one of the first reference signal and the second reference signal according to the third measurement gap pattern. According to one or more embodiments of this aspect, the first reference signal is at a first frequency and the second reference signal is at a second frequency different from the first frequency. According to one or more embodiments of this aspect, the performing of the at least one action includes at least one of extending and scaling a measurement time over which the wireless device performs measurement of one of the first reference signal and the second reference signal. According to one or more embodiments of this aspect, the first threshold value is associated with at least one of a type of measurement being performed on one of the first reference signal and the second reference signal, a type of radio access technology, RAT, associated with one of the first reference signal and the second reference signal, a periodicity of one of the first reference signal and the second reference signal, a periodicity of one of the first measurement gap pattern and the second measurement gap pattern, and a number of carriers associated with one of the first reference signal and the second reference signal.

According to another aspect of the present disclosure, a method implemented in a wireless device in communication with a network node is provided. A configuration is received, where the configuration indicates a first measurement gap pattern having a first plurality of measurement gaps and a second measurement gap pattern having a second plurality of measurement gaps. A first reference signal is measured according to the first measurement gap pattern and a second reference signal is measured according to the second measurement gap pattern. A number N of the first plurality of measurement gaps for performing measurements is cancelled based on an overlap of at least one of the first plurality of measurement gaps with at least one of the second plurality of measurement gaps. At least one action is performed based on N being greater than a first threshold value.

According to one or more embodiments of this aspect, the performing of the at least one action includes at least one of discarding at least one measurement of one of the first reference signal and the second reference signal, restarting the measurement of one of the first reference signal and the second reference signal, using a third measurement gap pattern according to a concurrent measurement gap pattern for performing the measurement on the first reference signal, and activating a pre-configured measurement gap pattern for performing the measurement on the first reference signal. According to one or more embodiments of this aspect, the measuring of the first reference signal according to the first measurement gap pattern includes obtaining at least one measurement sample during at least one of the first plurality of measurement gaps and the measuring of the second reference signal according to the second measurement gap pattern includes obtaining at least one measurement sample during at least one of the second plurality of measurement gaps. According to one or more embodiments of this aspect, the discarding of the at least one measurement of one of the first reference signal and the second reference signal includes discarding one of the at least one measurement sample obtained during at least one of the first plurality of measurement gaps, and the at least one measurement sample obtained during at least one of the second plurality of measurement gaps. According to one or more embodiments of this aspect, the restarting of the measurement of one of the first reference signal and the second reference signal includes, at a first time, discarding one of the at least one measurement sample obtained during at least one of the first plurality of measurement gaps prior to the first time and the at least one measurement sample obtained during at least one of the second plurality of measurement gaps prior to the first time, and further includes, subsequent to the first time, obtaining one of at least one measurement sample during at least one of the first plurality of measurement gaps, and at least one measurement sample during at least one of the second plurality of measurement gaps. According to one or more embodiments of this aspect, the discarding of the at least one measurement of one of the first reference signal and the second reference signal is further based on a number M being greater than a second threshold value, where M is a number of times a measurement of one of the first reference signal and the second reference signal was restarted. According to one or more embodiments of this aspect, the wireless device is pre-configured with a third measurement gap pattern, and the performing of the at least one action includes measuring one of the first reference signal and the second reference signal according to the third measurement gap pattern. According to one or more embodiments of this aspect, the first reference signal is at a first frequency and the second reference signal is at a second frequency different from the first frequency. According to one or more embodiments of this aspect, the performing of the at least one action includes at least one of extending and scaling a measurement time over which the wireless device performs measurement of one of the first reference signal and the second reference signal. According to one or more embodiments of this aspect, the first threshold value is associated with at least one of a type of measurement being performed on one of the first reference signal and the second reference signal, a type of radio access technology, RAT, associated with one of the first reference signal and the second reference signal, a periodicity of one of the first reference signal and the second reference signal, a periodicity of one of the first measurement gap pattern and the second measurement gap pattern, and a number of carriers associated with one of the first reference signal and the second reference signal.

According to another aspect of the present disclosure, a network node configured to communicate with a wireless device is provided. The network node includes processing circuitry configured to transmit a first reference signal according to a first measurement gap pattern having a first plurality of measurement gaps. The processing circuitry is further configured to receive a measurement report from the wireless device, where the measurement report is based on the transmitted first reference signal, and the measurement report indicates a number N of cancelled measurements associated with an overlap between the first plurality of measurement gaps and a second plurality of measurement gaps associated with a second measurement gap pattern. The processing circuitry is further configured to perform at least one action based on the received measurement report indicating a number N greater than a first threshold.

According to one or more embodiments of this aspect, the processing circuitry is further configured to configure the wireless device with the first measurement gap pattern and with the second measurement gap pattern. According to one or more embodiments of this aspect, the performing of the at least one action based on the received measurement report includes configuring the wireless device to restart the measurement of the first reference signal.

According to another aspect of the present disclosure, a method implemented in a network node configured to communicate with a wireless device is provided. A first reference signal is transmitted according to a first measurement gap pattern having a first plurality of measurement gaps. A measurement report is received from the wireless device, where the measurement report is based on the transmitted first reference signal, and the measurement report indicates a number N of cancelled measurements associated with an overlap between the first plurality of measurement gaps and a second plurality of measurement gaps associated with a second measurement gap pattern. At least one action is performed based on the received measurement report indicating a number N greater than a first threshold.

According to one or more embodiments of this aspect, the wireless device is configured with the first measurement gap pattern and with the second measurement gap pattern. According to one or more embodiments of this aspect, the performing of the at least one action based on the received measurement report includes configuring the wireless device to restart the measurement of the first reference signal.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 2(*a*) is a fully non-overlapped (FNO) measurement gap pattern (MGP);

FIG. 2(*b*) is a fully overlapped (FO) MGP;

FIG. 2(*c*) is a fully-partial overlapped (FPO) MGP;

FIG. 2(*d*) is a partially-fully overlapped (PFO) MGP;

FIG. 2(*e*) is a partially-partial overlapped (PPO) MGP;

FIG. 4 is a block diagram of a network node in communication with a wireless device over a wireless connection according to some embodiments of the present disclosure;

DETAILED DESCRIPTION

Figure 1:
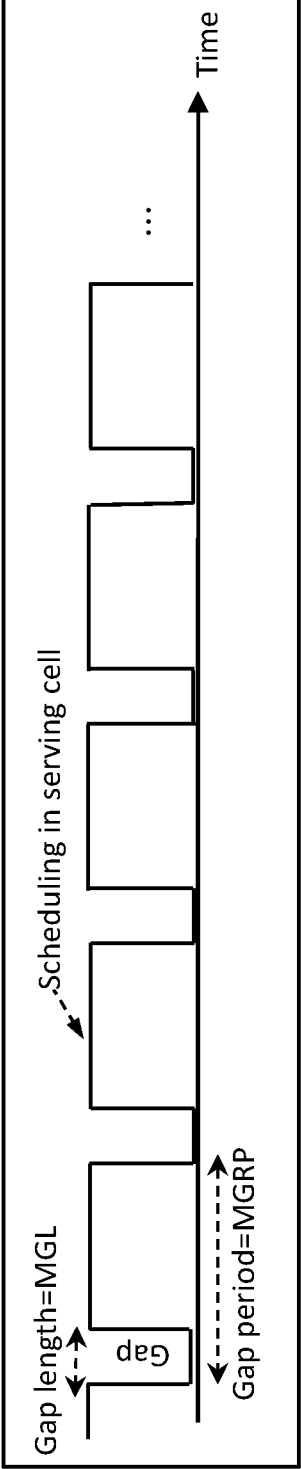
FIG. 1 is an example of a measurement gap pattern (MGP) in New Radio (NR)

Before describing in detail example embodiments, it is noted that the embodiments reside primarily in combinations of apparatus components and processing steps related to measurement rules under concurrent measurement gap cancellation. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

The term "node" used which may refer to a network node or a wireless device (WD).

Examples of network nodes are a NodeB, a base station (BS), a multi-standard radio (MSR) radio node such as MSR BS, an eNodeB, a gNodeB, an MeNB, an SeNB, location measurement unit (LMU), integrated access and backhaul (IAB) node, network controller, radio network controller (RNC), base station controller (BSC), relay, donor node controlling relay, base transceiver station (BTS), Central Unit (e.g. in a gNB), Distributed Unit (e.g. in a gNB), Baseband Unit, Centralized Baseband, C-RAN, access point (AP), transmission points, transmission nodes, transmission reception point (TRP), remote radio unit (RRU), remote radio head (RRH), nodes in distributed antenna system (DAS), core network node (e.g., mobile switching center (MSC), mobile management entity (MME), etc.), operations and management (O&M), operations support system (OSS), self-organizing network (SON), positioning node (e.g., evolved serving mobile location center (E-SMLC), etc.

The non-limiting term wireless device or user equipment (UE) refers to any type of wireless device communicating with a network node and/or with another wireless device in a cellular or mobile communication system. Examples of wireless device are target device, device to device (D2D) wireless device, vehicular to vehicular (V2V), machine type wireless device, MTC wireless device or wireless device capable of machine to machine (M2M) communication, personal digital assistant (PDA), tablet, mobile terminals, smart phone, laptop embedded equipment (LEE), laptop mounted equipment (LME), universal serial bus (USB) dongles, etc.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

The term radio access technology, or RAT, may refer to any RAT e.g. universal terrestrial radio access (UTRA), evolved UTRA (E-UTRA), narrow band internet of things (NB-IoT), Wi-Fi, Bluetooth, next generation RAT, New Radio (NR), 4G, 5G, etc. Any of the equipment denoted by the term node, network node or radio network node may be capable of supporting a single RAT or multiple RATs.

The term signal or radio signal used herein can be any physical signal or physical channel. Examples of downlink (DL) physical signals are reference signals (RS) such as primary synchronization signal (PSS), secondary synchronization signal (SSS), channel state information reference signal (CSI-RS), demodulation reference signal (DMRS) signals in SS/PBCH block (SSB), discovery reference signal (DRS), cell-specific reference signal (CRS), positioning reference signal (PRS), etc. A reference signal may be periodic. For example, an RS occasion carrying one or more RSs may occur with certain periodicity, e.g., 20 ms, 40 ms, etc. The RS may also be aperiodic. Each synchronization signal block (SSB) carries NR-PSS, NR-SSS and NR-PBCH in 4 successive symbols. One or multiple SSBs are transmitted in one SSB burst which is repeated with a certain periodicity, e.g. 5 ms, 10 ms, 20 ms, 40 ms, 80 ms and 160 ms. The wireless device may be configured with information about SSBs on cells of a certain carrier frequency by one or more SS/PBCH block measurement timing configuration (SMTC) configurations. The SMTC configuration comprises parameters such as SMTC periodicity, SMTC occasion length in time or duration, SMTC time offset with reference time (e.g. serving cell's SFN), etc. Therefore, SMTC occasion may also occur with certain periodicity e.g. 5 ms, 10 ms, 20 ms, 40 ms, 80 ms and 160 ms. Examples of uplink (UL) physical signals are reference signal such as sounding reference signals (SRS), demodulation reference signals (DMRS), etc. The term physical channel refers to any channel carrying higher layer information e.g., data, control, etc. Examples of physical channels are PBCH, NPBCH, PDCCH, PDSCH, sPUCCH, sPDSCH. sPUCCH. sPUSCH, MPDCCH, NPDCCH, NPDSCH, E-PDCCH, PUSCH, PUCCH, NPUSCH, etc.

The term time resource used herein may correspond to any type of physical resource or radio resource expressed in terms of length of time. Examples of time resources are: symbol, time slot, subframe, radio frame, transmission time interval (TTI), interleaving time, slot, sub-slot, mini-slot, etc.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 3:
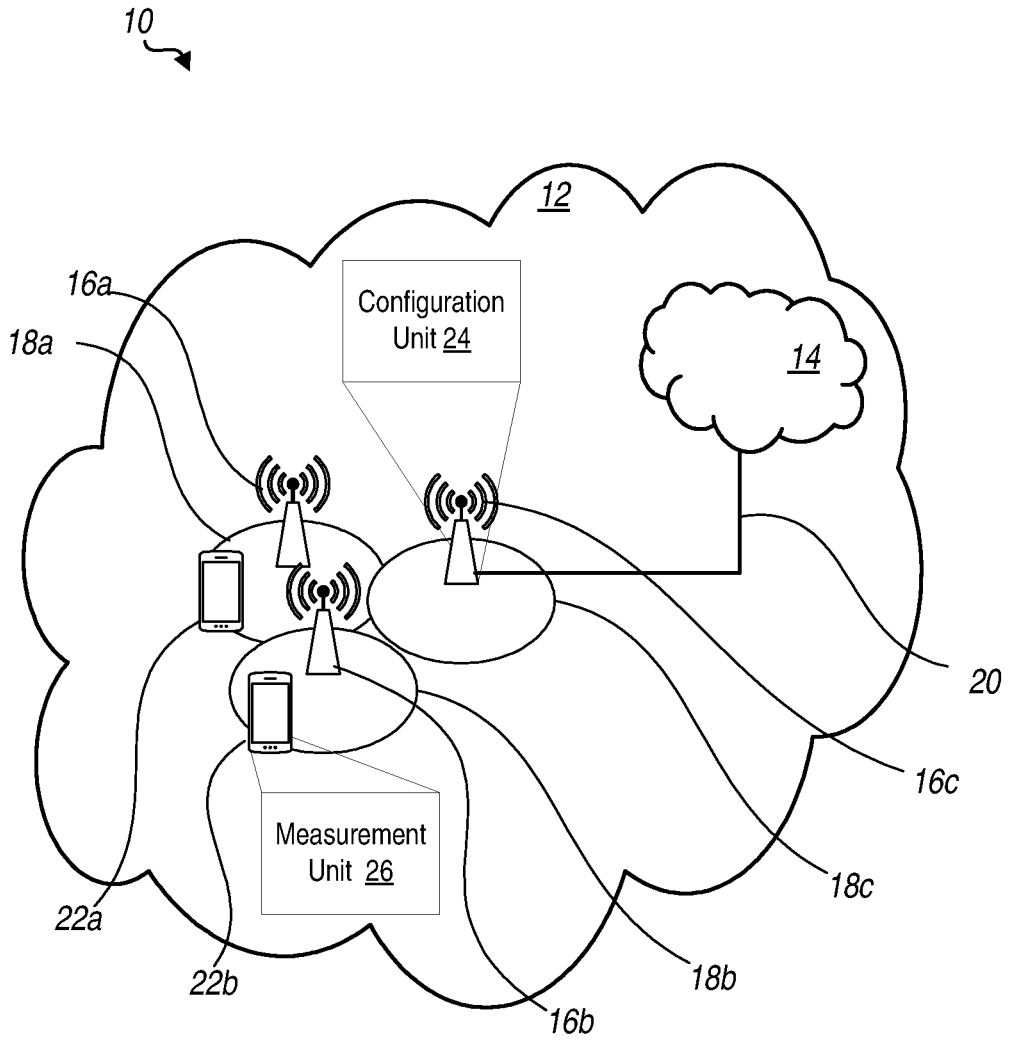
FIG. 3 is a schematic diagram of an example network architecture illustrating a communication system according to principles disclosed herein.

Referring again to the drawing figures, in which like elements are referred to by like reference numerals, there is shown in FIG. 3 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device 22a located in coverage area 18a is configured to wirelessly connect to, or be paged by, the corresponding network node 16a. A second wireless device 22b in coverage area 18b is wirelessly connectable to the corresponding network node 16b. While a plurality of wireless devices 22a, 22b (collectively referred to as wireless devices 22) are illustrated in this example, the disclosed embodiments are equally applicable to a situation where a sole wireless device is in the coverage area or where a sole wireless device is connecting to the corresponding network node 16. Note that although only two wireless devices 22 and three network nodes 16 are shown for convenience, the communication system may include many more wireless devices 22 and network nodes 16.

Also, it is contemplated that a wireless device 22 can be in simultaneous communication and/or configured to separately communicate with more than one network node 16 and more than one type of network node 16. For example, a wireless device 22 can have dual connectivity with a network node 16 that supports LTE and the same or a different network node 16 that supports NR. As an example, wireless device 22 can be in communication with an eNB for LTE/E-UTRAN and a gNB for NR/NG-RAN.

A network node 16 (eNB or gNB) is configured to include a configuration unit 24 that is configured to configure the wireless device 22: with a first measurement gap pattern, MGP1, having a first plurality of measurement gaps, and configure the wireless device with a second measurement gap pattern, MGP2, having a second plurality of measurement gaps. The wireless device 22 may include a measurement unit 26 configured to measure a first reference signal according to a first measurement gap pattern, MGP1, having a first plurality of measurement gaps and measure a second reference signal according to a second measurement gap pattern, MGP2, having a second plurality of measurement gaps Example implementations, in accordance with an embodiment, of the wireless device 22 and network node 16 discussed in the preceding paragraphs will now be described with reference to FIG. 4.

The communication system 10 includes a network node 16 provided in a communication system 10 and including hardware 28 enabling it to communicate with the wireless device 22. The hardware 28 may include a radio interface 30 for setting up and maintaining at least a wireless connection 32 with a wireless device 22 located in a coverage area 18 served by the network node 16. The radio interface 30 may be formed as or may include, for example, one or more RF transmitters, one or more RF receivers, and/or one or more RF transceivers. The radio interface 30 includes an array of antennas 34 to radiate and receive signal(s) carrying electromagnetic waves.

In the embodiment shown, the hardware 28 of the network node 16 further includes processing circuitry 36. The processing circuitry 36 may include a processor 38 and a memory 40. In particular, in addition to or instead of a processor, such as a central processing unit, and memory, the processing circuitry 36 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 38 may be configured to access (e.g., write to and/or read from) the memory 40, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 42 stored internally in, for example, memory 40, or stored in external memory (e.g., database, storage array, network storage device, etc.) accessible by the network node 16 via an external connection. The software 42 may be executable by the processing circuitry 36. The processing circuitry 36 may be configured to control any of the methods and/or processes described herein and/or to cause such methods, and/or processes to be performed, e.g., by network node 16. Processor 38 corresponds to one or more processors 38 for performing network node 16 functions described herein. The memory 40 is configured to store data, programmatic software code and/or other information described herein. In some embodiments, the software 42 may include instructions that, when executed by the processor 38 and/or processing circuitry 36, causes the processor 38 and/or processing circuitry 36 to perform the processes described herein with respect to network node 16. For example, processing circuitry 36 of the network node 16 may include a configuration unit 24 that is configured to configure the wireless device 22: with a first measurement gap pattern, MGP1, having a first plurality of measurement gaps, and configure the wireless device with a second measurement gap pattern, MGP2, having a second plurality of measurement gaps.

The communication system 10 further includes the wireless device 22 already referred to. The wireless device 22 may have hardware 44 that may include a radio interface 46 configured to set up and maintain a wireless connection 32 with a network node 16 serving a coverage area 18 in which the wireless device 22 is currently located. The radio interface 46 may be formed as or may include, for example, one or more RF transmitters, one or more RF receivers, and/or one or more RF transceivers. The radio interface 46 includes an array of antennas 48 to radiate and receive signal(s) carrying electromagnetic waves.

The hardware 44 of the wireless device 22 further includes processing circuitry 50. The processing circuitry 50 may include a processor 52 and memory 54. In particular, in addition to or instead of a processor, such as a central processing unit, and memory, the processing circuitry 50 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 52 may be configured to access (e.g., write to and/or read from) memory 54, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the wireless device 22 may further comprise software 56, which is stored in, for example, memory 54 at the wireless device 22, or stored in external memory (e.g., database, storage array, network storage device, etc.) accessible by the wireless device 22. The software 56 may be executable by the processing circuitry 50. The software 56 may include a client application 58. The client application 58 may be operable to provide a service to a human or non-human user via the wireless device 22.

The processing circuitry 50 may be configured to control any of the methods and/or processes described herein and/or to cause such methods, and/or processes to be performed, e.g., by wireless device 22. The processor 52 corresponds to one or more processors 52 for performing wireless device 22 functions described herein. The wireless device 22 includes memory 54 that is configured to store data, programmatic software code and/or other information described herein. In some embodiments, the software 56 and/or the client application 58 may include instructions that, when executed by the processor 52 and/or processing circuitry 50, causes the processor 52 and/or processing circuitry 50 to perform the processes described herein with respect to wireless device 22. For example, the processing circuitry 50 of the wireless device 22 may include a measurement unit 26 configured to measure a first reference signal according to a first measurement gap pattern, MGP1, having a first plurality of measurement gaps and measure a second reference signal according to a second measurement gap pattern, MGP2, having a second plurality of measurement gaps.

In some embodiments, the inner workings of the network node 16 and wireless device 22 may be as shown in FIG. 4 and independently, the surrounding network topology may be that of FIG. 3.

The wireless connection 32 between the wireless device 22 and the network node 16 is in accordance with the teachings of the embodiments described throughout this disclosure. More precisely, the teachings of some of these embodiments may improve the data rate, latency, and/or power consumption and thereby provide benefits such as reduced user waiting time, relaxed restriction on file size, better responsiveness, extended battery lifetime, etc. In some embodiments, a measurement procedure may be provided for the purpose of monitoring data rate, latency and other factors on which the one or more embodiments improve.

Although FIGS. 3 and 4 show various "units" such as configuration unit 24 and measurement unit 26 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 5:
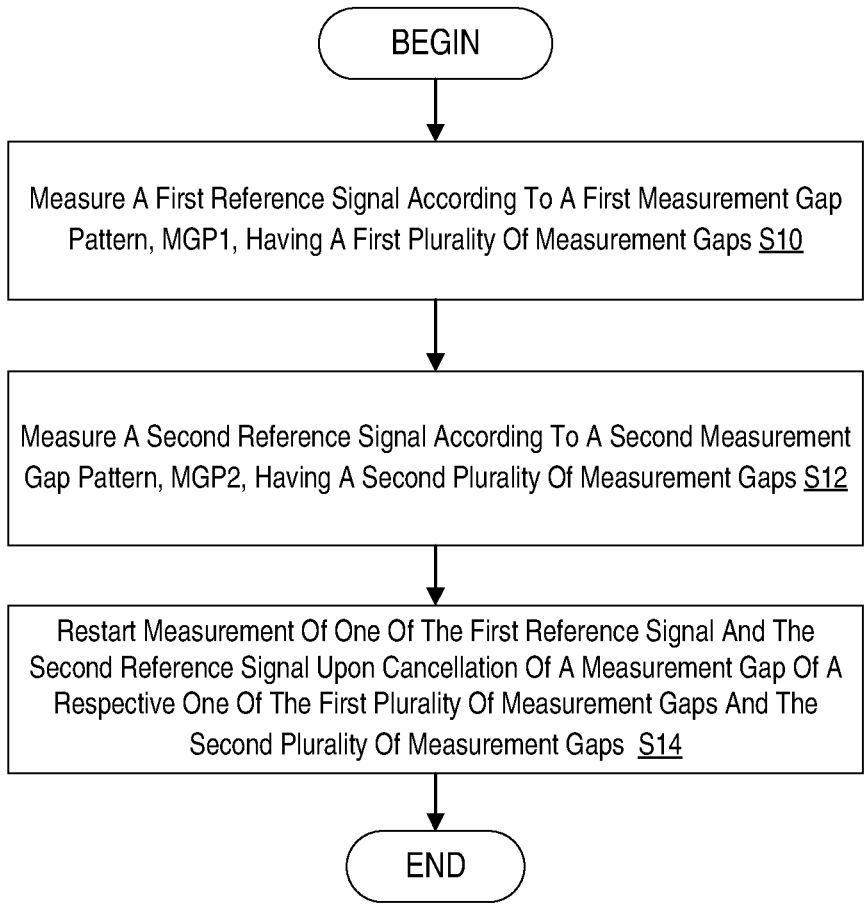
FIG. 5 is a flowchart of an example process in a wireless device for measurement rules under concurrent measurement gap cancellation according to some embodiments of the present disclosure.

FIG. 5 is a flowchart of an example process in a wireless device 22 for concurrent MGP. One or more blocks described herein may be performed by one or more elements of wireless device 22 such as by one or more of processing circuitry 50 (including the measurement unit 26), processor 52, and/or radio interface 46. The wireless device 22 is configured to measure a first reference signal according to a first measurement gap pattern, MGP1, having a first plurality of measurement gaps (Block S10). The process includes measuring a second reference signal according to a second measurement gap pattern, MGP2, having a second plurality of measurement gaps (Block S12). The process also includes restarting measurement of one of the first reference signal and the second reference signal upon cancellation of a measurement gap of a respective one of the first plurality of measurement gaps and the second plurality of measurement gaps (Block S14).

Figure 6:
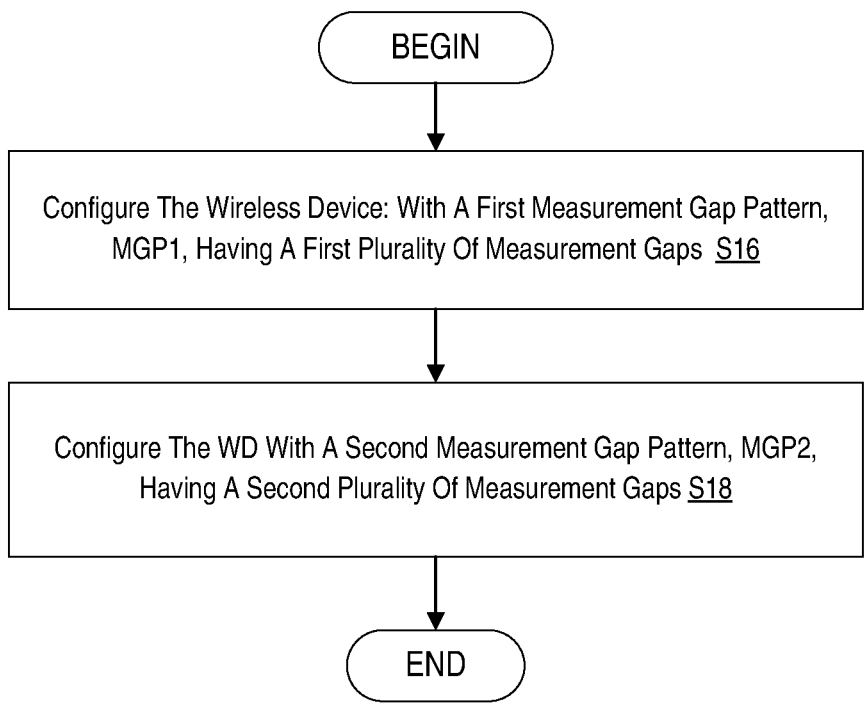
FIG. 6 is a flowchart of an example process in a network node for measurement rules under concurrent measurement gap cancellation.

FIG. 6 is a flowchart of an example process in a network node 16 according to some embodiments of the present disclosure. One or more blocks described herein may be performed by one or more elements of network node 16 such as via processing circuitry 36 (including the configuration unit 24) and/or processor 38 and/or radio interface 30. The configuration unit 24 is configured to configure the wireless device 22: with a first measurement gap pattern, MGP1, having a first plurality of measurement gaps (Block S16), and configure the wireless device with a second measurement gap pattern, MGP2, having a second plurality of measurement gaps (Block S18).

Figure 7:
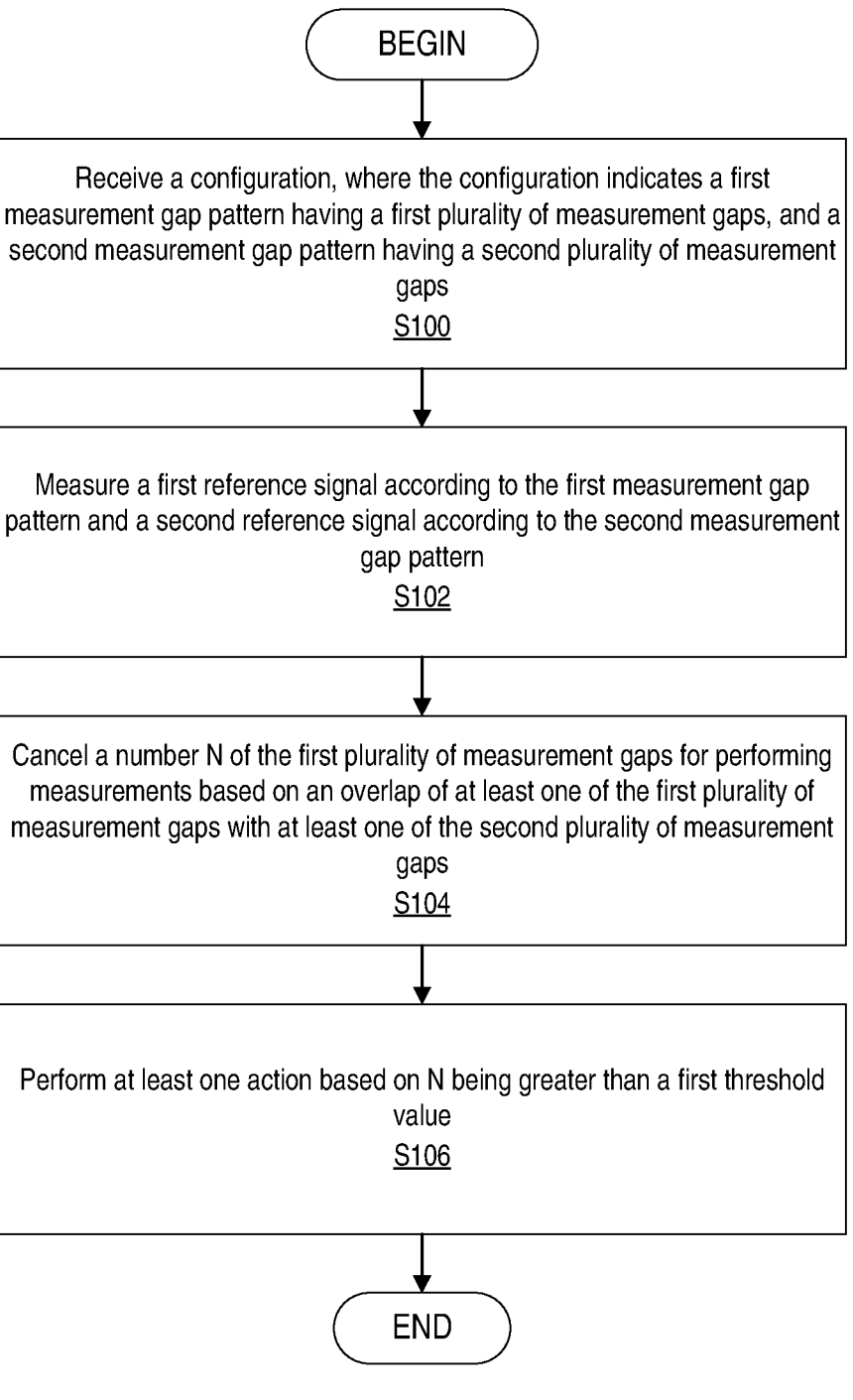
FIG. 7 is a flowchart of another example process in a wireless device for concurrent measurement gap cancellation.

FIG. 7 is a flowchart of another example process in a wireless device 22 for concurrent MGP. One or more blocks described herein may be performed by one or more elements of wireless device 22 such as by one or more of processing circuitry 50 (including the measurement unit 26), processor 52, and/or radio interface 46. The wireless device 22 is configured to receive (Block S100) a configuration, where the configuration indicates a first measurement gap pattern having a first plurality of measurement gaps, and a second measurement gap pattern having a second plurality of measurement gaps. The wireless device 22 is further configured to measure (Block S102) a first reference signal according to the first measurement gap pattern and a second reference signal according to the second measurement gap pattern. The wireless device 22 is further configured to cancel (Block S104) a number N of the first plurality of measurement gaps for performing measurements based on an overlap of at least one of the first plurality of measurement gaps with at least one of the second plurality of measurement gaps. The wireless device 22 is further configured to perform (Block S106) at least one action based on N being greater than a first threshold value.

In one or more embodiments, the performing of the at least one action includes at least one of discarding at least one measurement of one of the first reference signal and the second reference signal, restarting the measurement of one of the first reference signal and the second reference signal, using a third measurement gap pattern according to a concurrent measurement gap pattern for performing the measurement on the first reference signal, and activating a pre-configured measurement gap pattern for performing the measurement on the first reference signal. In one or more embodiments, the measuring of the first reference signal according to the first measurement gap pattern includes obtaining at least one measurement sample during at least one of the first plurality of measurement gaps and the measuring of the second reference signal according to the second measurement gap pattern includes obtaining at least one measurement sample during at least one of the second plurality of measurement gaps.

In one or more embodiments, the discarding of the at least one measurement of one of the first reference signal and the second reference signal includes discarding one of the at least one measurement sample obtained during at least one of the first plurality of measurement gaps, and the at least one measurement sample obtained during at least one of the second plurality of measurement gaps. In one or more embodiments, the restarting of the measurement of one of the first reference signal and the second reference signal includes, at a first time, discarding one of the at least one measurement sample obtained during at least one of the first plurality of measurement gaps prior to the first time and the at least one measurement sample obtained during at least one of the second plurality of measurement gaps prior to the first time, and further includes, subsequent to the first time, obtaining one of at least one measurement sample during at least one of the first plurality of measurement gaps, and at least one measurement sample during at least one of the second plurality of measurement gaps.

In one or more embodiments, the discarding of the at least one measurement of one of the first reference signal and the second reference signal is further based on a number M being greater than a second threshold value, where M is a number of times a measurement of one of the first reference signal and the second reference signal was restarted. In one or more embodiments, the wireless device 22 is pre-configured with a third measurement gap pattern, and the performing of the at least one action includes measuring one of the first reference signal and the second reference signal according to the third measurement gap pattern. In one or more embodiments, the first reference signal is at a first frequency and the second reference signal is at a second frequency different from the first frequency. In one or more embodiments, the performing of the at least one action includes at least one of extending and scaling a measurement time over which the wireless device 22 performs measurement of one of the first reference signal and the second reference signal. In one or more embodiments, the first threshold value is associated with at least one of a type of measurement being performed on one of the first reference signal and the second reference signal, a type of radio access technology, RAT, associated with one of the first reference signal and the second reference signal, a periodicity of one of the first reference signal and the second reference signal, a periodicity of one of the first measurement gap pattern and the second measurement gap pattern, and a number of carriers associated with one of the first reference signal and the second reference signal.

Figure 8:
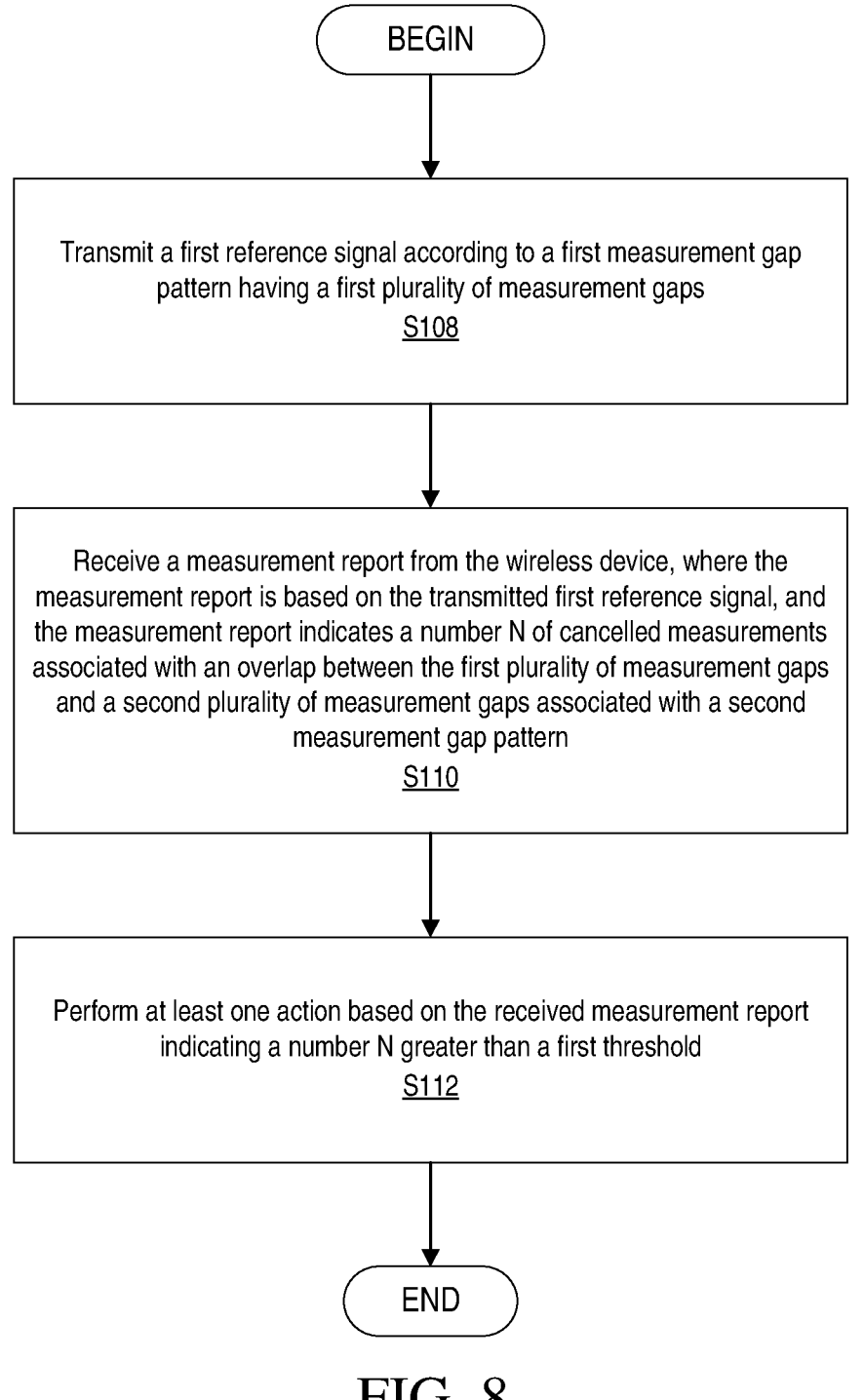
FIG. 8 is a flowchart of another example process in a network node for concurrent measurement gap cancellation.

FIG. 8 is a flowchart of another example process in a network node 16 according to some embodiments of the present disclosure. One or more blocks described herein may be performed by one or more elements of network node 16 such as via processing circuitry 36 (including the configuration unit 24) and/or processor 38 and/or radio interface 30. The network node 16 is configured to transmit (Block S108) a first reference signal according to a first measurement gap pattern having a first plurality of measurement gaps. The network node 16 is further configured to receive (Block S110) a measurement report from the wireless device, where the measurement report is based on the transmitted first reference signal, and the measurement report indicates a number N of cancelled measurements associated with an overlap between the first plurality of measurement gaps and a second plurality of measurement gaps associated with a second measurement gap pattern. The network node is further configured to perform (Block S112) at least one action based on the received measurement report indicating a number N greater than a first threshold.

According to one or more embodiments of this aspect, the network node 16 is further configured to configure the wireless device 22 with the first measurement gap pattern and with the second measurement gap pattern. According to one or more embodiments of this aspect, the performing of the at least one action based on the received measurement report includes configuring the wireless device 22 to restart the measurement of the first reference signal.

Having described the general process flow of arrangements of the disclosure and having provided examples of hardware and software arrangements for implementing the processes and functions of the disclosure, the sections below provide details and examples of arrangements for measurement rules under concurrent measurement gap cancellation.

In some embodiments, the wireless device 22 is configured with a concurrent measurement gap pattern (C-MGP) comprising at least a first measurement gap pattern (MGP1) and a second measurement gap pattern (MGP2). Each of the measurement gap patterns is characterized by a measurement gap length (MGL), a measurement gap repetition period (MGRP), a measurement gap offset (MGO) relating to the measurement gap e.g., to the frame border of system frame number (SFN) 0, and a measurement gap timing advance (MGTA) which may shift the position of the measurement gap by, for example, 0, 0.25 or 0.5 ms relative to the measurement gap starting point given by MGO. Other shifts may be implemented. MGP1 may be characterized by parameters MGL1, MGRP1, MGO1 and MGTA1. Similarly, MGP2 may be characterized by parameters MGL2, MGRP2, MGO2 and MGTA2. In some embodiments all the parameters associated with MGP1 and MGP2 are different, e.g., MGRP1 is not equal to MGRP2, MGTA1 is not equal to MGTA2, MGL1 is not equal to MGL2 and MGO1 is not equal to MGO2. In some embodiments, some of the parameters associated with MGP1 and MGP2 are different while others may be the same, e.g., MGRP1=MGRP2 and MGTA1=MGTA2, while MGL1 is not equal to MGL2 and MGO1 is not equal to MGO2.

Each of the measurement gap patterns (e.g. MGP1, MGP2, etc.) in the C-MGP may also be called individual measurement gap patterns. For simplicity, embodiments may be described with 2 individual MGPs, but they are applicable to any number of individual MGPs within the C-MGP.

The measurement gaps of the individual measurement gap patterns in the C-MGP may have any duration of overlap in time: fully non-overlapping gaps, fully overlapping measurement gaps and partially overlapping measurement gaps.

Figure 9:
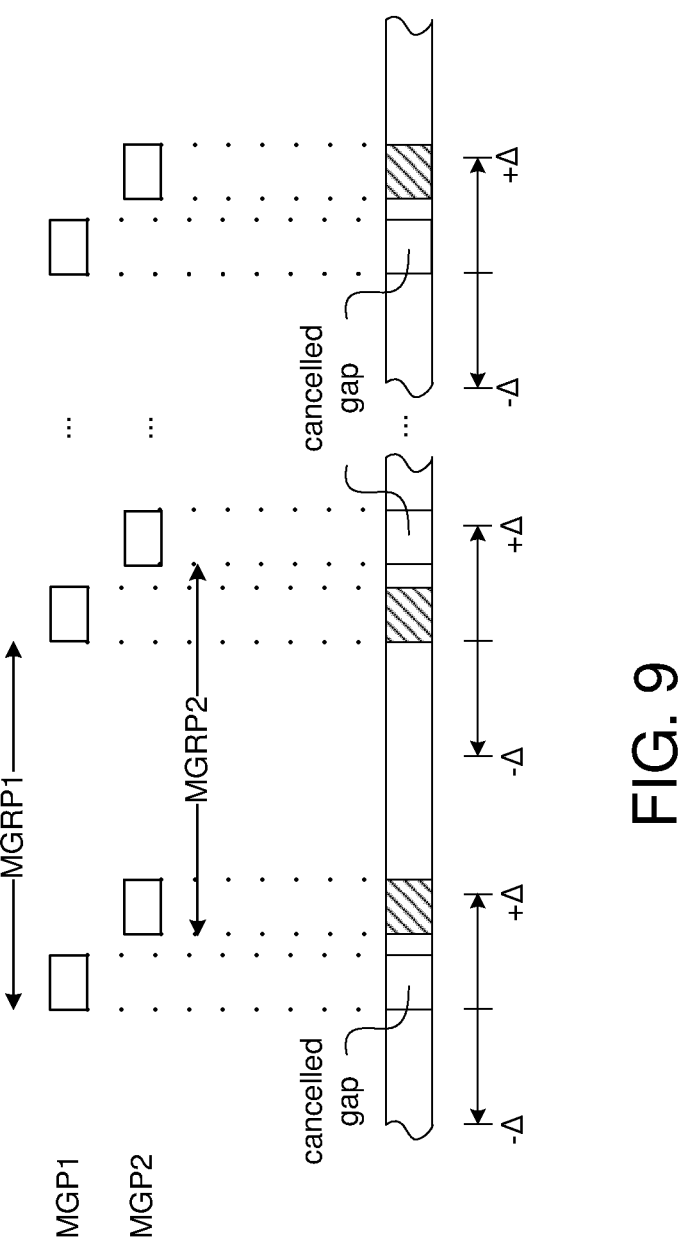
FIG. 9 is an example of measurement gap cancellation by a wireless device.

The wireless device 22 may cancel one or more measurement gaps of one or more measurement gap patterns within the concurrent measurement gap pattern based on one or more rules, which may be pre-defined or configured by the network node 16. For example, the wireless device 22 may cancel the measurement gap if the starting points of the individual measurement gaps are apart in time by less than a certain threshold (Δ). An example is shown in FIG. 9. In one example, Δ=10 ms for subcarrier spacing (SCS)=15 kHz and Δ=20 ms for SCS=120 kHz, etc. In another example, Δ may be smaller if there is an ongoing data transmission (e.g., PDCCH reception, PDSCH reception, PUCCH transmission, PUSCH transmission, etc.) between the wireless device 22 and the serving cell, compared to the case when there is no data transmission.

The wireless device 22 may further be configured to perform one or more measurements on a reference signal (RS) using the C-MGP, e.g., one or more measurements using MGP1 and one or more measurements using MGP2. For example, the wireless device 22 may be configured to perform a first measurement (M1) on a first RS (RS1) on a first carrier (F1) using MGP1 and a second measurement (M2) on a second RS (RS2) using MGP2. In one example, M1 and M2 are measured on RSs of the carriers of the same RAT, e.g., M1 and M2 may be measured on a RS for NR. In one example, RS1 and RS2 can be of the same type, e.g., RS1 and RS2 may be SSBs. In another example, RS1 and RS2 can be of different types, e.g., RS1 may be SSB and RS2 may be CSI-RS respectively, or RS1 and RS2 are SSB and PRS, respectively, etc. In another example, M1 and M2 are measured on RSs of the carriers of different RATs, e.g., M1 is measured on a RS (e.g., SSB) of NR and M2 is measured on a RS (e.g., cell-specific reference signal (CRS)) of E-UTRA.

Methods in a wireless device 22 for adapting measurement procedures under measurement gap cancellation are provided. The wireless device 22, upon determining that the wireless device 22 has cancelled or is going to cancel one or more measurement gaps belonging to the C-MGP, adapts one or more measurement procedures. The wireless device 22 applies the measurement gap cancellation based on one or more rules as described above. Therefore, the wireless device 22 can determine that one or more measurement gaps are cancelled or going to be cancelled by internally retrieving the measurement gap cancellation information. Examples of adaptive measurement procedures comprising one or more of the following rules, which can be pre-defined or configured by the network node 16, include at least:

Methods for restarting measurement upon measurement gap cancellation;

Methods for discarding, abandoning or dropping a measurement upon measurement gap cancellation;

Methods for using another measurement gap pattern within the concurrent measurement gap pattern upon measurement gap cancellation;

Methods for activating a pre-configured measurement gap pattern upon measurement gap cancellation.

The above adaptive measurement procedures may further require the wireless device 22 to adapt one or more requirements. The wireless device 22 may meet adaptive requirements for the adaptive measurement. Examples of requirements are measurement time, measurement accuracy, measurement reporting delay, number of cells to be measured during the measurement time, etc. Examples of measurement time are: physical layer measurement period, evaluation period, cell detection time, etc. Examples of measurement accuracy are signal: a measurement value being within ±X1 dB compared to a reference measurement accuracy value (e.g., ideal measurement without any error), a timing measurement value being within ±X2 time units compared to a reference measurement accuracy value (e.g., ideal measurement without any error), etc. Examples of time units are seconds, ms, μs, ns, Tc, Ts, etc., where 1 Tc»0.5 ns and 1 Ts»32.55 ns.

In another example, the adaptive requirement may comprise an extended measurement time (Tme) over which the wireless device 22 performs measurement under measurement gap cancellation only when the measurement gap cancellation rate exceeds some pre-defined value or by a network configured threshold, Rcg. The measurement gap cancellation rate may be defined as the number of measurement gaps cancelled over a period of time, e.g., over the measurement period or over a pre-defined period, etc. When the rate of cancelled measurement gaps in the particular measurement gap pattern exceeds Rcg over the observed time period, e.g., over the most recent Tmr or multiple thereof, the wireless device 22 may meet requirements over a measurement time (Tme) which is longer than the reference measurement time (Tmr), i.e., Tme>Tmr. Different Rcg thresholds may apply for different measurement procedures and for different measurement configurations.

The above adaptive measurement procedures and associated adaptive requirements are described in detail below with examples.

Methods of restarting measurements upon measurement gap cancellation are provided. According to one adaptive measurement procedure, whether the wireless device 22 continues the measurement or restarts the measurement due to measurement gap cancellation depends on a relationship or comparison or mapping between:

the number of cancelled measurement gaps or expected number of cancelled measurement gaps (Ng) of the MGP within C-MGP used for the measurement during a measurement period (Tm) of the measurement; and a threshold number of cancelled measurement gaps or expected number of cancelled measurement gaps (Hg).

The relationship or comparison can be pre-defined or configured by the network node 16.

In one example:

The wireless device 22 restarts an ongoing measurement if the number of cancelled measurement gaps or the expected number of cancelled measurement gaps (Ng) of the MGP within the C-MGP used for the measurement during a measurement period (Tm) of the measurement is larger than a certain threshold (Hg);

Otherwise (if Ng≤Hg) the wireless device 22 continues the ongoing measurement.

Restarting the measurement may comprise discarding (or dropping or abandoning) the measurement samples obtained or estimated before the measurement is restarted and using only the measurement samples obtained or estimated after the measurement is restarted.

Continuing the measurement may comprise using measurement samples obtained or estimated before and after the measurement gap cancellation during the measurement time.

Hg can be pre-defined or configured by the network node 16, e.g.:

1. In one example, Hg is fixed, e.g., Hg=1. In another example, Hg=4.

2. In another example, Hg depends upon the types of measurements, e.g., Hg=2 for SSB based measurements (e.g., SS-reference signal received power (RSRP), synchronization signal (SS)-reference signal received quality (RSRQ), SS-signal to interference plus noise ratio (SINR), etc.) and Hg=4 for PRS based measurements (e.g., reference signal time difference, (RSTD), PRS-RSRP, wireless device 22 receive-transmit time difference, etc.)

3. In another example, Hg depends upon the type of RAT on which the measurement is done, e.g., Hg=2 for NR and Hg=5 for E-UTRA, etc.

4. In another example, Hg depends upon one or more RS configuration parameters of the RS being measured. Examples of RS configuration parameters for SSB as a RS are SSB periodicity, SMTC periodicity, etc. Examples of RS configuration parameters for PRS as a RS are PRS resource periodicity, PRS resource set periodicity, number of PRS resource repetitions, etc. For example, the threshold Hg may be below a certain level if RS periodicity (e.g., SMTC periodicity, SSB periodicity, etc.) is above another threshold; otherwise, Hg may be equal to or above the other threshold. For example, if SMTC periodicity (Tsmtc) is longer than 40 ms then Hg<2; otherwise (if Tsmc≤40 ms) then Hg≥2 (e.g., Hg=4).

5. In another example, Hg depends upon one or more MGP configuration parameters of an MGP which is used for the measurement and whose measurement gaps are cancelled or will be cancelled. For example, the threshold Hg is below a certain level if the MGRP is above another threshold; otherwise Hg is equal to or above the other threshold. For example, if MGRP is longer than 40 ms, then Hg<2; otherwise (if MGRP≤40 ms) then Hg≥2 (e.g., Hg=4).

6. In another example, Hg depends upon number of carriers (Nc) configured for measurements using MGP whose measurement gaps are cancelled or will be cancelled. For example, if Nc is above a certain threshold (Hc) then Hg is below another certain threshold; otherwise Hg is equal to or above the Hc. For example, assume Hc=2, and assume that Nc is 3 or more, then Hg=2; otherwise (Nc≤2) then Hg≥2 (e.g., Hg=4).

The adaptive requirements (e.g., adaptive measurement time (Tme)) are described below with a some examples:

1. In case the wireless device 22 does not restart the measurement (e.g. Ng≤Hg) then in one general example Tme and Tmr are related as follows:

$$Tme = f0(Tmr, Ng, Nt, \alpha).$$

In one specific example:

$$Tme = Tmr + Tmr * Ng/Nt + \alpha.$$

In another specific example:

$$Tme = Tmr * 1/\left(1 - \left(Ng/Nt\right)\right) + \alpha.$$

In yet another example, Tmr and Tme are related as follows:

$$Tme = f0(Tmr, Ng, Nt, Rcg, \alpha).$$

A specific example is:

$$Tme = Tmr + \alpha \qquad \text{when } Ng/Nt \leq Rcg;$$
$$Tme = Tmr + Tmr * \left(Ng/Nt - Rcg\right) + \alpha \quad \text{when } Ng/Nt > Rcg.$$

In some embodiments:

Nt is the total number of measurement gaps required for measurement during Tmr using the MGP.

α is a margin. In one example $\alpha=0$. In another example $\alpha>0$.

Rcg is a threshold value for the measurement gap cancellation rate, with effective values in the range $0\le Rcg\le Hg/Nt$. For Rcg=0, Tme will always be scaled up when one or more measurement gaps are cancelled. For Rcg=Hg/Nt, Tme will never be scaled up when measurement gaps are cancelled.

2. In case the wireless device 22 restarts the measurement (e.g. Ng>Hg), in one general example Tme and Tmr are related as follows:

$$Tme = f1(Tmr, Nr, \beta).$$

In one specific example:

$$Tme = (Nr + 1) * Tmr + \beta.$$

In some embodiments:

Nr is the number of times the wireless device 22 restarts the measurement due to the measurement gap cancellation performed using the MGP.

β is a margin. In one example $\beta=0$. In another example $\beta>0$.

Methods of discarding measurements upon measurement gap cancellation are provided.

According to some embodiments, an adaptive measurement procedure that applies whether the wireless device 22 discards measurement or not, due to measurement gap cancellation, depends on a relationship between the number of cancelled measurement gaps and a threshold (Hm), or a relationship between a number of times the wireless device 22 has restarted the measurement due to measurement gap cancellation and a threshold (Hr). The relationship can be pre-defined or configured by the network node 16. The rule to discard the measurement is elaborated below with some examples:

Whether the wireless device 22 discards (abandons or drop) the measurement or not, due to measurement gap cancellation depends on a relationship or comparison or mapping between:

the number of cancelled measurement gaps or expected number of cancelled measurement gaps (Ng) of the MGP within C-MGP used for the measurement during a measurement period (Tm) of the measurement; and a threshold number of cancelled measurement gaps or expected number of cancelled measurement gaps (Hm).

In one example:

The wireless device 22 discards an ongoing measurement if Ng>Hm;

Otherwise, (if Ng≤Hm), the wireless device 22 does not discard the ongoing measurement.

Whether the wireless device 22 discards (abandons or drop) the measurement or not, due to measurement gap cancellation depends on a relation or comparison or mapping between:

the number of times (Nr) the wireless device 22 restarts the measurement due to the measurement gap cancellation when measuring using the MGP; and a threshold number of times the wireless device 22 restarted the measurement (Hr).

In one specific example:

The wireless device 22 discards an ongoing measurement if Nr>Hr;

Otherwise, (if Nr≤Hr), the wireless device 22 does not discard the ongoing measurement.

In some embodiments, if the wireless device 22 discards the measurement, then the wireless device 22 may not perform that measurement unless the wireless device 22 is configured by the measurement to again perform the same measurement.

The wireless device 22 may further inform the network node 16 (e.g. via RRC, medium access control control element (MAC-CE), layer 1 (L1) signaling, etc.) that the wireless device 22 has discarded the measurement.

If the wireless device 22 does not discard the measurement, then the wireless device 22 may continue performing the measurement or it may restart the measurement as described above with reference to a method of restarting the measurement.

Methods of using another measurement gap pattern in a concurrent measurement gap pattern upon measurement gap cancellation are provided.

In some embodiments, the wireless device 22 may switch to another MGP, which is different than the MGP currently being used by the wireless device 22 for performing the ongoing measurement, based on: a relationship between the parameter Ng and a threshold (Hgs); or a relationship between the parameter Nr and a threshold (Hrs), where Ng and Nr are defined above. The relationship between a parameter and its corresponding threshold can be pre-defined or configured by the network node 16.

In one example of the relationship:

The wireless device 22 switches to a different MGP than the currently used MGP for performing the measurement if Ng>Hgs;

Otherwise, (if Ng≤Hgs), the wireless device 22 continues using the MGP currently being used for performing the measurement.

In another example, of the relationship:

The wireless device 22 switches to a different MGP than the currently used MGP for performing the measurement if Nr>Hrs;

Otherwise, (if Nr≤Hrs), the wireless device 22 continues using the MGP currently being used for performing the measurement.

Switching to another MGP within a C-MGP may comprise selecting and using one of the configured MGPs belonging to the C-MGP for performing the ongoing, configured measurement. For example, assume that the C-MGP comprises MGP1 and MGP2, and the wireless device 22 is configured to perform measurement, M1, using MGP1:

In one example, if Ng>Hgs, (e.g., Ng=5 and Hgs=4), then the wireless device 22 may stop performing the measurement M1 using MGP1, and instead starts using MGP2 for performing the measurement M1;

In another example, if Nr>Hrs, (e.g., Nr=3 and Hrs=2), then the wireless device 22 stops performing measurement M1 using MGP1, and instead starts using MGP2 for performing the measurement M1.

The adaptive requirements of some embodiments, (e.g., adaptive measurement time (Tme)), for when the wireless device 22 switches to another MGP are described below with some examples:

1. In case the wireless device 22 switches the MGP when Ng>Hgs then in one general example Tme, Tmr1 and Tmr2 are related as follows:

$$Tme = f2(Tmr1, Tmr2, \psi1).$$

In one specific example:

$$Tme = Tmr1 + Tmr2 + \psi1.$$

In another specific example:

$$Tme = \text{MAX}(Tmr1, Tmr2) + \psi1.$$

In some embodiments:

Tmr1 is a measurement time over which the wireless device 22 performs a measurement using MGP1 when no measurement gap cancellation is applied;

Tmr2 is a measurement time over which the wireless device 22 performs a measurement using MGP2 when no measurement gap cancellation is applied;

MGP1 is used by the wireless device 22 for performing the measurement before switching to another MGP, MGP2; and/or $\psi1$ is a margin. In one example, $\psi1=0$. In another example $\psi1>0$.

2. In case the wireless device 22 switches the MGP when Ng>Hgs, then in another general example, Tme, Tmr1 and Tmr2 are related as follows:

$$Tme = f3(Tmr1, Tmr2, Ng, Nt, \psi2).$$

Examples of functions that may be applied to determine Tme are maximum, sum, average, product, etc.

In one more specific example, the wireless device 22 may restart the measurement using another MGP:

$$Tme = Tmr2 + Ng/Nt * Tmr1 + \psi2.$$

In another specific example, the wireless device 22 may restart the measurement using another MGP:

$$Tme = (Nt - Ng)/Nt * Tmr2 + Ng/Nt * Tmr1 + \psi2.$$

In another specific example:

$$Tme = \text{MAX}(Tmr2, g1(Ng, Nt) * Tmr1) + \psi2.$$

In some embodiments, g1 (Ng, Nt)=Ng/Nt and in another example, g1 (Ng, Nt)=Nt/Ng.

In another example:

$$Tme = \text{MAX}\left(Tmr2, Tmr1 * 1/\left(1 - \left(Ng/Nt\right)\right)\right) + \psi2.$$

In some embodiments:

Nt is the total number of measurement gaps required for measurement during Tmr using the MGP; during Tmr1 when MGP1 is used; and $\psi2$ is a margin. In one example $\psi=0$. In another example $\psi2>0$.

3. In case the wireless device 22 switches the MGP when Nr>Hrs, then in one example, Tme, Tmr1 and Tmr2 are related as follows:

$$Tme = f4(Tmr1, Tmr2, Nr, \psi3).$$

In another example:

$$Tme = Tmr2 + (Nr + 1) * Tmr1 + \psi3.$$

In another example:

$$Tme = \text{MAX}\left(Tmr2, Tmr1 * 1/\left(1 - \left(Ng/Nt\right)\right)\right) + Nr * Tmr1 + \psi3.$$

In some embodiments:

Nr is the number of times the wireless device 22 restarts the measurement due to the measurement gap cancellation performed using the MGP (e.g., MGP1) used before switching to another MGP (e.g., to MGP2); and/or $\psi3$ is a margin. In one example $\psi3=0$. In another example $\psi3>0$.

Methods of activating a pre-configured measurement gap pattern upon measurement gap cancellation are provided. In some embodiments, the wireless device 22 may activate and use one of the pre-configured MGPs for performing the ongoing measurement based on: a relationship between the parameter Ng and a threshold (Hgp), or a relationship between the parameter Nr and a threshold (Hrp), where Ng and Nr are defined above. The relationship may be pre-defined or configured by the network node 16.

In one example of the relationship:

The wireless device 22 activates and uses one of the pre-configured MGP (P-MGP) for performing the measurement if Ng>Hgp;

Otherwise, (if Ng≤Hgp), the wireless device 22 continues using the MGP (within the C-MGP) currently being used for performing the measurement.

In another example of the relationship:

The wireless device 22 activates and uses one of the P-MGP for performing the measurement if Nr>Hrp;

Otherwise, (if Nr≤Hrp), the wireless device 22 continues using the MGP (within C-MGP) currently being used for performing the measurement.

The wireless device 22 may be configured (e.g., via RRC) with one or more pre-configured MGPs (e.g. P-MGP1, P-MGP2, etc.) The P-MGP may be associated with the same type of parameters as other MGPs, i.e., MGL, MGRP, MGO, MGTA, etc. However, the P-MGP may have one of the two status levels at one time: activated status and deactivated status:

The wireless device 22 can use the P-MGP for performing the measurement when the P-MGP is activated or under activation state;

The wireless device 22 does not use the P-MGP for performing the measurement when the P-MGP is deactivated or under deactivation state.

The activation status of P-MGP may also be called an ON state, an active state, etc. The deactivation status of P-MGP may also be called an OFF state, an inactive state, etc.

For example, assume that the wireless device 22 is configured to perform measurement M1 using MGP1 belonging to the C-MGP. Also assume that the wireless device 22 is also configured with one P-MGP, namely P-MGP1 whose status is 'deactivated'. When the condition in one of the relationships described above is met (e.g., Ng>Hgp), then the wireless device 22 may activate the P-MGP1 (i.e., the P-MGP changes its status from deactivation to activation) and starts using the P-MGP1 for continuing the measurement M1. The wireless device 22 may further inform the network node 16 that it has activated the P-MGP1. The wireless device 22 may further inform the network node 16 the reason for activating P-MGP1, for example, due to measurement gap cancellation.

The adaptive requirements of some embodiments (e.g., adaptive measurement time (Tme)) when the wireless device 22 activates and uses P-MGP are described below with some examples:

1. In case the wireless device 22 activates and switches to P-MGP for measurement when Ng>Hgp, then in one example Tme, Tmr1 and Tmrp are related as follows:

$$Tme = f5(Tmr1, Tmrp, \mu1).$$

In one example:

$$Tme = Tmr1 + Tmrp + \mu1.$$

In another example:

$$Tme = MAX(Tmr1, Tmrp) + \mu1.$$

In some embodiments:

Tmr1 is a measurement time over which the wireless device 22 performs a measurement using MGP1 when no measurement gap cancellation is applied;

Tmrg is a measurement time over which the wireless device 22 performs a measurement using P-MGP (e.g. P-MGP) when no measurement gap cancellation is applied;

MGP1 is used by the wireless device 22 for performing the measurement before activating and using the P-MGP e.g. P-MGP1;

$\mu1$ is a margin. In one example $\mu1=0$. In another example $\mu1>0$.

2. In case the wireless device 22 activates and switches to P-MGP for measurement when Ng>Hrp, then in another example Tme, Tmr1 and Tmr2 are related as follows:

$$Tme = f6(Tmr1, Tmrg, Ng, Nt, \mu2).$$

In one example:

$$Tme = Tmrg + Ng/Nt * Tmr1 + \mu2.$$

In another example:

$$Tme = (Nt - Ng)/Nt * Tmrg + Ng/Nt * Tmr1 + \mu2.$$

In another example:

$$Tme = MAX(Tmrg, g2(Ng, Nt) * Tmr1) + \mu2.$$

In one example, g2 (Ng, Nt)=Ng/Nt and in another example, g2 (Ng, Nt)=Nt/Ng.

In some embodiments:

Nt is the total number of measurement gaps required for measurement during Tmr using the MGP, during Tmr1 when MGP1 is used; and $\mu2$ is a margin. In one example $\mu2=0$. In another example $\mu2>0$.

According to one aspect, a method in a wireless device (WD) 22 includes: measuring, via the processing circuitry 50, a first reference signal according to a first measurement gap pattern, MGP1, having a first plurality of measurement gaps; measuring a second reference signal according to a second measurement gap pattern, MGP2, having a second plurality of measurement gaps; and restarting measurement of one of the first reference signal and the second reference signal upon cancellation of a measurement gap of a respective one of the first plurality of measurement gaps and the second plurality of measurement gaps.

According to this aspect, in some embodiments, the method includes discarding a measurement of one of the first reference signal and the second reference signal upon cancellation of the measurement gap. In some embodiments, the method also includes measuring one of the first reference signal and the second reference signal according to a third measurement gap pattern, MGP3, upon cancellation of the measurement gap. In some embodiments, the method also includes activating a pre-configured third measurement gap pattern, MGP3, upon cancellation of the measurement gap. In some embodiments, the first reference signal is at a first frequency and the second reference signal is at a second frequency different from the first frequency.

According to another aspect, a wireless device 22 includes processing circuitry 50 configured to: measure a first reference signal according to a first measurement gap pattern, MGP1, having a first plurality of measurement gaps; measure a second reference signal according to a second measurement gap pattern, MGP2, having a second plurality of measurement gaps; and restart measurement of one of the first reference signal and the second reference signal upon cancellation of a measurement gap of a respective one of the first plurality of measurement gaps and the second plurality of measurement gaps.

According to this aspect, in some embodiments, the processing circuitry 50 is further configured to discard a measurement of one of the first reference signal and the second reference signal upon cancellation of the measurement gap. In some embodiments, the processing circuitry 50 is further configured to measure one of the first reference signal and the second reference signal according to a third measurement gap pattern, MGP3, upon cancellation of the measurement gap. In some embodiments, the processing circuitry 50 is further configured to activate a pre-configured third measurement gap pattern, MGP3, upon cancellation of the measurement gap. In some embodiments, the first reference signal is at a first frequency and the second reference signal is at a second frequency different from the first frequency.

According to yet another aspect, a method in a network node 16 configured to communicate with a wireless device is provided. The method includes configuring, via the processing circuitry 36, the wireless device: with a first measurement gap pattern, MGP1, having a first plurality of measurement gaps; and with a second measurement gap pattern, MGP2, having a second plurality of measurement gaps.

According to another aspect, a network node 16 configured to communicate with a wireless device 22 is provided. The network node 16 includes processing circuitry 36 configured to configure the wireless device 22: with a first measurement gap pattern, MGP1, having a first plurality of measurement gaps; and with a second measurement gap pattern, MGP2, having a second plurality of measurement gaps.

Some Examples:

Example A1. A method in a wireless device, wireless device 22, the method comprising:

measuring a first reference signal according to a first measurement gap pattern, MGP1, having a first plurality of measurement gaps;

measuring a second reference signal according to a second measurement gap pattern, MGP2, having a second plurality of measurement gaps; and restarting measurement of one of the first reference signal and the second reference signal upon cancellation of a measurement gap of a respective one of the first plurality of measurement gaps and the second plurality of measurement gaps.

A2. The method of Example A1, further comprising discarding a measurement of one of the first reference signal and the second reference signal upon cancellation of the measurement gap.

A3. The method of any of Examples A1 and A22, further comprising measuring one of the first reference signal and the second reference signal according to a third measurement gap pattern, MGP3, upon cancellation of the measurement gap.

A4. The method of any of Examples A1 and A2, further comprising activating a pre-configured third measurement gap pattern, MGP3, upon cancellation of the measurement gap.

A5. The method of any of Examples A1-A4, wherein the first reference signal is at a first frequency and the second reference signal is at a second frequency different from the first frequency.

B1. A wireless device, wireless device 22, comprising processing circuitry configured to:

measure a first reference signal according to a first measurement gap pattern, MGP1, having a first plurality of measurement gaps;

measure a second reference signal according to a second measurement gap pattern, MGP2, having a second plurality of measurement gaps; and restart measurement of one of the first reference signal and the second reference signal upon cancellation of a measurement gap of a respective one of the first plurality of measurement gaps and the second plurality of measurement gaps.

B2. The wireless device 22 of Example B1, wherein the processing circuitry is further configured to discard a measurement of one of the first reference signal and the second reference signal upon cancellation of the measurement gap.

B3. The wireless device 22 of any of Examples B1 and B2, wherein the processing circuitry is further configured to measure one of the first reference signal and the second reference signal according to a third measurement gap pattern, MGP3, upon cancellation of the measurement gap.

B4. The wireless device 22 of any of Examples B1and B2, wherein the processing circuitry is further configured to activate a pre-configured third measurement gap pattern, MGP3, upon cancellation of the measurement gap.

B5. The wireless device 22 of any of Examples B1-B4, wherein the first reference signal is at a first frequency and the second reference signal is at a second frequency different from the first frequency.

C1. A method in a network node 16 configured to communicate with a wireless device, the method comprising:

configuring the wireless device:

with a first measurement gap pattern, MGP1, having a first plurality of measurement gaps; and with a second measurement gap pattern, MGP2, having a second plurality of measurement gaps.

D1. A network node 16 configured to communicate with a wireless device, the network node 16 comprising processing circuitry configured to:

configure the wireless device:

with a first measurement gap pattern, MGP1, having a first plurality of measurement gaps; and with a second measurement gap pattern, MGP2, having a second plurality of measurement gaps.

Some abbreviations used herein may include the following:

Abbreviation Explanation

ACK Acknowledgement
AR Augmented reality
BLER Block error rate
BWP Bandwidth part
C-MGP Concurrent MGP
CP Cyclic prefix
CSI-RS Channel state information reference signals
CSSF Carrier-specific scaling factor
DCI Downlink control information
DL Downlink
eMBB Evolved mobile broadband
FDD Frequency division duplex
FR1 Frequency range 1
FR2 Frequency range 2
FR3 Frequency range 3
gNB Next generation Node B (5G base station)
HARQ Hybrid automatic repeat request
IMS IP Multimedia Subsystem
MAC Medium access control
MGL Measurement gap length
MGO Measurement gap offset
MGP Measurement gap pattern
MGRP Measurement gap repetition period
MGTA Measurement gap timing advance
NACK Negative acknowledgement
NR New radio (5G)
PBCH Physical broadcast channel
PDCCH Physical downlink control channel
PDSCH Physical downlink shared channel
PRS Positioning reference signals
PUCCH Physical uplink control channel
PUSCH Physical uplink shared channel
RAT Radio access technology
RRC Radio resource control RRM Radio resource management SCS Subcarrier spacing SFN System frame number SMTC SSB measurement timing configuration SRS Sounding reference signal SSB Synchronization signal and PBCH block TDD Time division duplex UE User equipment UL Uplink URLLC Ultra-reliable low-latency communication VR Virtual reality XR Extended reality As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A wireless device in communication with a network node, the wireless device comprising processing circuitry configured to:

receive a configuration, the configuration indicating a first measurement gap pattern having a first plurality of measurement gaps, and a second measurement gap pattern having a second plurality of measurement gaps;

measure a first reference signal according to the first measurement gap pattern and a second reference signal according to the second measurement gap pattern;

cancel a number N of the first plurality of measurement gaps for performing measurements based on an overlap of at least one of the first plurality of measurement gaps with at least one of the second plurality of measurement gaps; and perform at least one action based on N being greater than a first threshold value, the performing of the at least one action including at least one of:

discarding at least one measurement of one of the first reference signal and the second reference signal;

restarting the measurement of one of the first reference signal and the second reference signal;

using a third measurement gap pattern according to a concurrent measurement gap pattern for performing the measurement on the first reference signal; and activating a pre-configured measurement gap pattern for performing the measurement on the first reference signal.

2. The wireless device of claim 1, wherein:

the measuring of the first reference signal according to the first measurement gap pattern includes obtaining at least one measurement sample during at least one of the first plurality of measurement gaps; and the measuring of the second reference signal according to the second measurement gap pattern including obtaining at least one measurement sample during at least one of the second plurality of measurement gaps.

3. The wireless device of claim 2, wherein:

the discarding of the at least one measurement of one of the first reference signal and the second reference signal includes discarding one of:

the at least one measurement sample obtained during at least one of the first plurality of measurement gaps, and the at least one measurement sample obtained during at least one of the second plurality of measurement gaps.

4. The wireless device of claim 2, wherein:

the restarting of the measurement of one of the first reference signal and the second reference signal includes:

at a first time, discarding one of:

the at least one measurement sample obtained during at least one of the first plurality of measurement gaps prior to the first time, and the at least one measurement sample obtained during at least one of the second plurality of measurement gaps prior to the first time; and subsequent to the first time, obtaining one of:

at least one measurement sample during at least one of the first plurality of measurement gaps; and at least one measurement sample during at least one of the second plurality of measurement gaps.

5. The wireless device of claim 1, wherein the discarding of the at least one measurement of one of the first reference signal and the second reference signal is further based on a number M being greater than a second threshold value, M being a number of times a measurement of one of the first reference signal and the second reference signal was restarted.

6. The wireless device of claim 1, wherein the wireless device is pre-configured with a third measurement gap pattern, the performing of the at least one action including measuring one of the first reference signal and the second reference signal according to the third measurement gap pattern.

7. The wireless device of claim 1, wherein the first reference signal is at a first frequency and the second reference signal is at a second frequency different from the first frequency.

8. The wireless device of claim 1, wherein the performing of the at least one action includes at least one of extending and scaling a measurement time over which the wireless device performs measurement of one of the first reference signal and the second reference signal.

9. The wireless device of claim 1, wherein the first threshold value is associated with at least one of:

a type of measurement being performed on one of the first reference signal and the second reference signal;

a type of radio access technology, RAT, associated with one of the first reference signal and the second reference signal;

a periodicity of one of the first reference signal and the second reference signal;

a periodicity of one of the first measurement gap pattern and the second measurement gap pattern; and a number of carriers associated with one of the first reference signal and the second reference signal.

10. A method for a wireless device in communication with a network node, the method comprising:

receiving a configuration, the configuration indicating a first measurement gap pattern having a first plurality of measurement gaps, and a second measurement gap pattern having a second plurality of measurement gaps;

measuring a first reference signal according to the first measurement gap pattern and a second reference signal according to the second measurement gap pattern;

cancelling a number N of the first plurality of measurement gaps for performing measurements based on an overlap of at least one of the first plurality of measurement gaps with at least one of the second plurality of measurement gaps; and performing at least one action based on N being greater than a first threshold value, the performing of the at least one action including at least one of:

discarding at least one measurement of one of the first reference signal and the second reference signal;

restarting the measurement of one of the first reference signal and the second reference signal:

using a third measurement gap pattern according to a concurrent measurement gap pattern for performing the measurement on the first reference signal; and activating a pre-configured measurement gap pattern for performing the measurement on the first reference signal.

11. The method of claim 10, wherein:

the measuring of the first reference signal according to the first measurement gap pattern includes obtaining at least one measurement sample during at least one of the first plurality of measurement gaps; and the measuring of the second reference signal according to the second measurement gap pattern including obtaining at least one measurement sample during at least one of the second plurality of measurement gaps.

12. The method of claim 11, wherein:

the discarding of the at least one measurement of one of the first reference signal and the second reference signal includes discarding one of:

the at least one measurement sample obtained during at least one of the first plurality of measurement gaps, and the at least one measurement sample obtained during at least one of the second plurality of measurement gaps.

13. The method of claim 11, wherein:

the restarting of the measurement of one of the first reference signal and the second reference signal includes:

at a first time, discarding one of:

the at least one measurement sample obtained during at least one of the first plurality of measurement gaps prior to the first time, and the at least one measurement sample obtained during at least one of the second plurality of measurement gaps prior to the first time; and subsequent to the first time, obtaining one of:

at least one measurement sample during at least one of the first plurality of measurement gaps; and at least one measurement sample during at least one of the second plurality of measurement gaps.

14. The method of claim 10, wherein the discarding of the at least one measurement of one of the first reference signal and the second reference signal is further based on a number M being greater than a second threshold value, M being a number of times a measurement of one of the first reference signal and the second reference signal was restarted.

15. The method of claim 10, wherein the wireless device is pre-configured with a third measurement gap pattern, the performing of the at least one action including measuring one of the first reference signal and the second reference signal according to the third measurement gap pattern.

16. The method of claim 10, wherein the first reference signal is at a first frequency and the second reference signal is at a second frequency different from the first frequency.

17. The method of claim 10, wherein the performing of the at least one action includes at least one of extending and scaling a measurement time over which the wireless device performs measurement of one of the first reference signal and the second reference signal.

18. The method of claim 10, wherein the first threshold value is associated with at least one of:
a type of measurement being performed on one of the first reference signal and the second reference signal;
a type of radio access technology, RAT, associated with one of the first reference signal and the second reference signal;
a periodicity of one of the first reference signal and the second reference signal;
a periodicity of one of the first measurement gap pattern and the second measurement gap pattern; and
a number of carriers associated with one of the first reference signal and the second reference signal.

19. A network node configured to communicate with a wireless device, the network node comprising processing circuitry configured to:
transmit a first reference signal according to a first measurement gap pattern having a first plurality of measurement gaps;
receive a measurement report from the wireless device, the measurement report being based on the transmitted first reference signal, the measurement report indicating a number N of cancelled measurements associated with an overlap between the first plurality of measurement gaps and a second plurality of measurement gaps associated with a second measurement gap pattern; and perform at least one action based on the received measurement report indicating a number N greater than a first threshold;
configure the wireless device with the first measurement gap pattern and with the second measurement gap pattern; and
the performing of the at least one action based on the received measurement report including configuring the wireless device to at least one of:
discard at least one measurement of one of the first reference signal and the second reference signal;
restart the measurement of the first reference signal;
use a third measurement gap pattern according to a concurrent measurement gap pattern for performing the measurement on the first reference signal; and
activate a pre-configured measurement gap pattern for performing the measurement on the first reference signal.

20. A method for a network node configured to communicate with a wireless device, the method comprising:
transmitting a first reference signal according to a first measurement gap pattern having a first plurality of measurement gaps;
receiving a measurement report from the wireless device, the measurement report being based on the transmitted first reference signal, the measurement report indicating a number N of cancelled measurements associated with an overlap between the first plurality of measurement gaps and a second plurality of measurement gaps associated with a second measurement gap pattern; and
performing at least one action based on the received measurement report indicating a number N greater than a first threshold;
configuring the wireless device with the first measurement gap pattern and with the second measurement gap pattern; and
the performing of the at least one action based on the received measurement report includes configuring the wireless device to at least one of:
discard at least one measurement of one of the first reference signal and the second reference signal;
restart the measurement of the first reference signal;
use a third measurement gap pattern according to a concurrent measurement gap pattern for performing the measurement on the first reference signal; and
activate a pre-configured measurement gap pattern for performing the measurement on the first reference signal.

* * * * *